(12) United States Patent
Lev-Ran et al.

(10) Patent No.: US 7,636,767 B2
(45) Date of Patent: Dec. 22, 2009

(54) METHOD AND APPARATUS FOR REDUCING NETWORK TRAFFIC OVER LOW BANDWIDTH LINKS

(75) Inventors: Etai Lev-Ran, Sunnyvale, CA (US); Israel Cidon, Haifa (IL); Israel Zvi Ben-Shaul, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 540 days.

(21) Appl. No.: 11/290,188

(22) Filed: Nov. 29, 2005

(65) Prior Publication Data

US 2007/0124415 A1    May 31, 2007

(51) Int. Cl.
G06F 15/16 (2006.01)
(52) U.S. Cl. ............... 709/218; 709/231; 709/232; 709/233; 709/234; 709/235; 709/247
(58) Field of Classification Search ............... 709/219
See application file for complete search history.

(56) References Cited

U.S. PATENT DOCUMENTS

| | | | |
|---|---|---|---|
| 4,498,142 A * | 2/1985 | Advani et al. | 715/700 |
| 4,916,605 A * | 4/1990 | Beardsley et al. | 711/162 |
| 5,454,108 A | 9/1995 | Devarakonda et al. | |
| 5,483,657 A * | 1/1996 | Hatakeyama | 712/27 |
| 5,555,388 A | 9/1996 | Shaughnessy | |
| 5,560,008 A | 9/1996 | Johnson et al. | |
| 5,596,754 A | 1/1997 | Lomet | |
| 5,682,534 A | 10/1997 | Kapoor et al. | |
| 5,740,367 A | 4/1998 | Spilo | |
| 5,745,747 A | 4/1998 | Chang et al. | |
| 5,956,712 A | 9/1999 | Bennett et al. | |
| 6,182,139 B1 * | 1/2001 | Brendel | 709/226 |

(Continued)

OTHER PUBLICATIONS

Academic Press Dictionary of Science and Technology. Oxford: Elsevier Science & Technology (1992). Retrieved Aug. 13, 2008, from http://www.credoreference.com/entry/3086303/.*

(Continued)

*Primary Examiner*—Firmin Backer
*Assistant Examiner*—Patrick A. Nagel
(74) *Attorney, Agent, or Firm*—Hickman Palermo Truong & Becker LLP

(57) ABSTRACT

A method is disclosed for reducing network traffic. At a sender, a data chunk is identified for transmission to a receiver, which is connected to the sender over a communication link. The sender computes a signature of the data chunk and determines whether the data chunk has been previously transmitted by looking up the signature in a sender index table. The sender index table associates the signatures of previously transmitted data chunks with unique index values. A message is transmitted to the receiver, where if the data chunk has previously been transmitted then the message includes an index value from the sender index table that is associated with the signature of the data chunk. At the receiver, the data chunk is located in a receiver cache that stores the previously transmitted data chunks by looking up the index value included in the message in a receiver index table. The receiver index table associates the unique index values with the locations in the receiver cache of the previously transmitted data chunks.

38 Claims, 9 Drawing Sheets

U.S. PATENT DOCUMENTS

| | | | |
|---|---|---|---|
| 6,189,046 B1 | 2/2001 | Moore et al. | |
| 6,282,581 B1 | 8/2001 | Moore et al. | |
| 6,405,274 B1 | 6/2002 | Chan | |
| 6,408,342 B1 | 6/2002 | Moore et al. | |
| 6,567,405 B1 * | 5/2003 | Borella et al. | 370/389 |
| 6,574,654 B1 | 6/2003 | Simmons et al. | |
| 6,667,700 B1 * | 12/2003 | McCanne et al. | 341/51 |
| 6,668,270 B1 | 12/2003 | Simmons et al. | |
| 6,668,295 B1 | 12/2003 | Chan | |
| 6,828,925 B2 * | 12/2004 | McCanne et al. | 341/51 |
| 7,047,299 B1 | 5/2006 | Curtis | |
| 7,047,536 B1 | 5/2006 | Duncan et al. | |
| 7,116,249 B2 * | 10/2006 | McCanne et al. | 341/50 |
| 7,139,811 B2 | 11/2006 | Lev Ran et al. | |
| 7,299,282 B2 | 11/2007 | Sarkissian et al. | |
| 7,424,722 B2 | 9/2008 | Joseph | |
| 2002/0019874 A1 | 2/2002 | Borr | |
| 2003/0009480 A1 | 1/2003 | Lin et al. | |
| 2003/0018785 A1 | 1/2003 | Eshel et al. | |
| 2003/0018878 A1 * | 1/2003 | Dorward et al. | 711/216 |
| 2003/0195937 A1 * | 10/2003 | Kircher et al. | 709/207 |
| 2004/0088376 A1 * | 5/2004 | McCanne et al. | 709/219 |
| 2004/0168057 A1 * | 8/2004 | Margolus et al. | 713/158 |
| 2004/0168058 A1 * | 8/2004 | Margolus | 713/158 |
| 2004/0174276 A1 * | 9/2004 | McCanne et al. | 341/50 |
| 2004/0215746 A1 * | 10/2004 | McCanne et al. | 709/219 |
| 2004/0243703 A1 * | 12/2004 | Demmer et al. | 709/224 |
| 2005/0125553 A1 * | 6/2005 | Wu et al. | 709/233 |
| 2005/0273792 A1 | 12/2005 | Inohara et al. | |
| 2006/0009213 A1 | 1/2006 | Sturniolo et al. | |

OTHER PUBLICATIONS

Burns, Randal C., et al., "A Linear Time Constant Space Differencing Algorithms," Performance Computing, and Communications Conference, Feb. 5-7, 1997, pp. 429-436.

Schleimer, Saul et al., "Winnowing: Local Algorithms for Document Fingerprinting," ACM Sigmond Conference, Jun. 9-12, 2003, located on the internet at http://www.cs.berkeley.edu/~dsw/winnowing.pdf, 10 pages.

Snia, "Common Internet File System (CIFS) Technical Reference, Revision: 1.0," Storage Networking Industry Association, Technical Proposal Mar. 1, 2002, 150 pages.

Spring, Neil T., "A Protocol-Independent Technique for Eliminating Redundant Network Traffic," Proceedings of the 2000 ACM Sigcomm Conference, Aug. 2000, located on the internet at http://www.cs.washington.edu/homes/nspring/papers/sigcomm2000.pdf, pp. 87-95.

Tridgell, Andrew et al., "The rsync Algorithm," Nov. 9, 1998, located on the internet at http://rsync.samba.org, 9 pages.

Muthitacharoen, Athicha et al., "A Low-bandwidth Network File System," MIT Laboratory for Computer Science and NYU Department of Computer Science, Oct. 2001, 14 pages.

Muller et al. "Fast, Optimized Sun RPC Using Automatic Program Specialization", 1998 IEEE, 10 pages.

Zelesko et al. "Specializing Object-Oriented RPC for Functionality and Performance", 1996 IEEE, pp. 175-187.

Narender et al. "Dynamic RPC for Extensibility", 1992 IEEE, pp. 93-100.

* cited by examiner

METHOD AND APPARATUS FOR REDUCING NETWORK TRAFFIC OVER LOW BANDWIDTH LINKS

FIELD OF THE INVENTION

The present invention generally relates to network communications. The invention relates more specifically to a method and apparatus for reducing network traffic.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Geographically dispersed enterprises often deploy distributed computer systems to enable information sharing throughout the enterprise. Such distributed systems generally comprise an enterprise network, which includes a number of Local Area Networks (LANs) that are connected over one or more Wide Area Network (WAN) communication links. An enterprise network generally includes one or more servers that store enterprise information in one or more data resources. The servers supply the data from the resources upon receiving requests for the data from other enterprise servers or clients, which servers or clients may be established in the LAN that is local to the data resource or may be established in a LAN that is located across the WAN.

For example, the business structure of an enterprise may comprise a main office, and one or more branch offices. To support this business structure, the enterprise typically employs a local LAN for each of the main and branch offices, and one or more WAN communication links that connect the LANs at the branch offices with the LAN at the main office. This network infrastructure enables users at the branch offices, who run software applications locally on their workstations, to access files that are located at the main office.

While this network infrastructure allows for greater sharing of information for users throughout the enterprise, it also has a significant disadvantage because software applications that access data resources are primarily designed to access the data resources over a relatively high-speed LAN. Usually, significant latency and performance degradation are observed when a software application accesses a data resource that is located across the WAN in a remote LAN. In a typical example, an enterprise user in a branch office uses a word-processing application to access and modify files. Usually, operations on files that are in the LAN local to the user are relatively quick, while operations on files that are located across the WAN are relatively slow and sometimes unreliable.

One of the reasons for the above-described performance degradation is the limited or insufficient bandwidth of the WAN link across which the data resources are accessed. When a client application needs to access a data resource such as a file, the client application usually first reads the file over the WAN link from a server on the remote LAN, modifies the file according to changes initiated by a user, and then writes back the file over the WAN link to the server on the remote LAN. Thus, the client application effectively transfers the file over the WAN link twice—once when it first reads the file and once when the modified file is written back. Since the WAN link usually has low or limited bandwidth, the latency in response times for the users of the client applications is relatively high. Furthermore, since the WAN link is usually shared between client applications, client applications that are interactive and read/write intensive tend to monopolize the use of the WAN link and to starve other less aggressive network applications for bandwidth.

The above problems caused by insufficient bandwidth are not unique to WAN links. Similar problems of high latency and high response times are observed by client applications that transfer data over other low bandwidth communication links, such as, for example, dial-up connections, Digital Subscriber Line (DSL) connections, and Integrated Services Digital Network (ISDN) connections.

A general scheme to address the negative effects caused by insufficient bandwidth is to limit the amount of redundant data transferred over a low bandwidth communication link. One past approach to limit redundant data traffic over low bandwidth communication links is described by Muthitacharoen et al., in "*A Low-Bandwidth Network File System*", published in October 2001. Muthitacharoen et al. describes a low bandwidth file system (LBFS) that is specifically designed to operate over low bandwidth communication links.

However, the LBFS approach of Muthitacharoen et al. has numerous disadvantages. One disadvantage is that it can only reduce network traffic that pertains to accessing files managed through an LBFS file system. Thus, the LBFS approach is inapplicable as a general solution for reducing any network traffic over a communication link that may or may not have low bandwidth.

Another disadvantage is that the LBFS approach requires custom protocol semantics for accessing files managed through an LBFS server. For example, the LBFS approach provides its own READ and WRITE functions to read from and write to files that are accessed through a LBFS server. However, these custom protocol semantics are not compatible with any existing and widely deployed file systems, such as File Allocation Table (FAT) file system, Windows NT File System (NTFS), eXtended File System (XFS), UNIX File System (UFS), Veritas File System (VxFS), and other Unix-type file systems. For example, the LBFS approach requires special software drivers, or an LBFS client, to be installed on any computer system that needs to access files across a low bandwidth communication link, and also requires that an LBFS server be installed on the computer system that physically stores the files. Since the LBFS approach is not compatible with existing file systems, it is not suitable for large-scale deployment in a network environment that uses such existing file systems.

Yet another disadvantage of the LBFS approach is that it does not support on-line, or interactive, access to the files stored across a low bandwidth communication link. The LBFS approach transmits data across the communication link only on OPEN file and CLOSE file commands that are issued from an application using a file. For example, a file is transmitted to a LBFS client when an application utilizing the client requests to open the file. The file is then modified by the application, but changes to the file are transmitted to the LBFS server by the LBFS client only after the application has requested that the file be closed. This significantly limits the ability of applications to concurrently share files accessed through a LBFS server, and consequently the LBFS approach lacks the scalability for deployment in the networks of large and geographically dispersed enterprises.

Based on the foregoing, there is a clear need for techniques for reducing network traffic, which techniques are scalable, applicable to any type of network traffic over any type of communication links, and which support the protocol semantics of existing file systems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
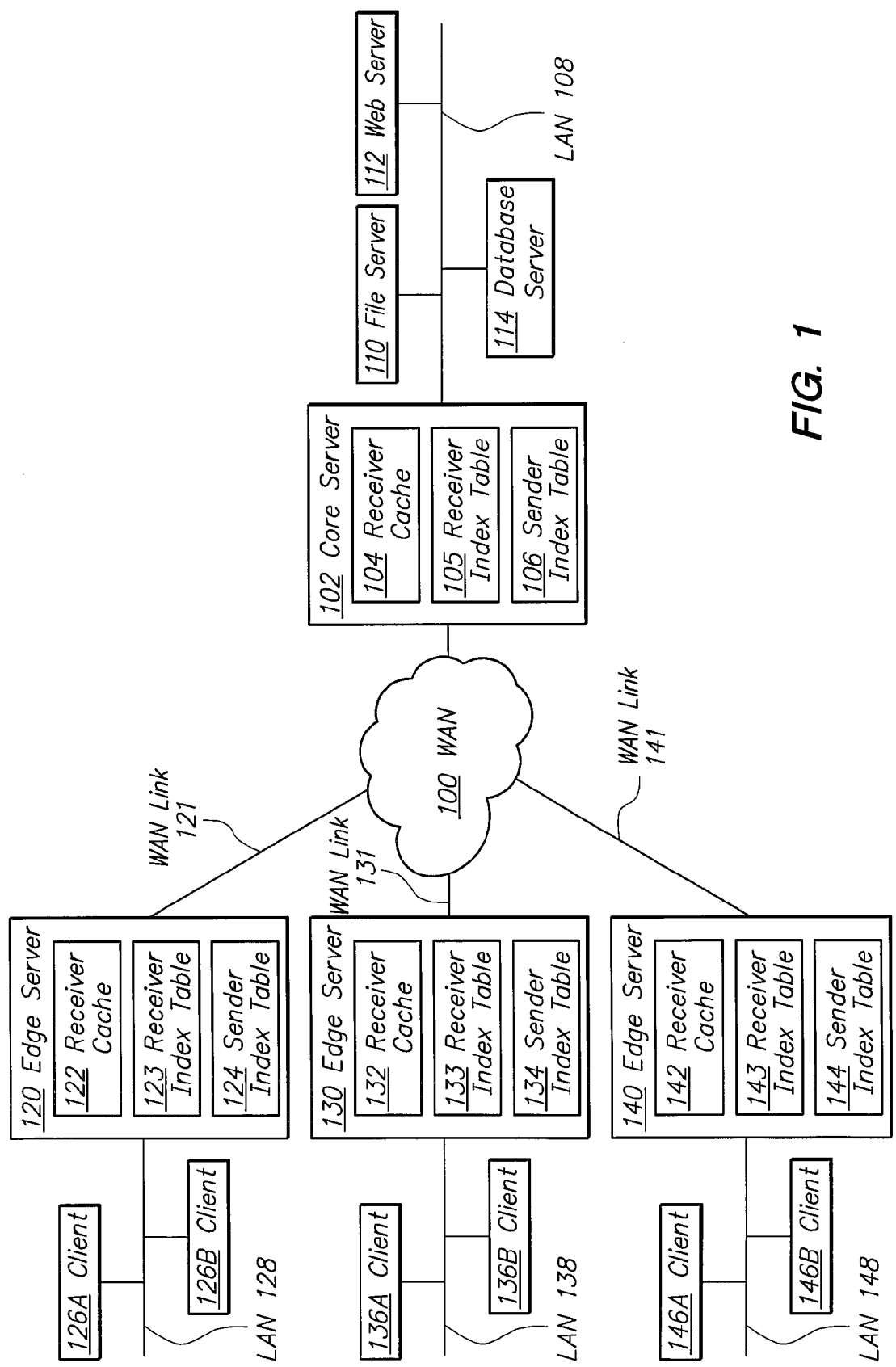
FIG. 1 is a block diagram that illustrates an overview of an operational context in which an embodiment may be implemented.

A method and apparatus for reducing network traffic is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural Overview
   2.1 Operational Context of an Embodiment
   2.2 Synchronized Data Transmission Context
   2.3 Structural Elements According to an Embodiment
3.0 Functional Overview
4.0 Method of Reducing Network Traffic
   4.1 Identifying Data Chunks in a Data Block
   4.2 Computing Signatures for Data Chunks
   4.3 Sender Side Data Structures
   4.4 Receiver Side Data Structures
   4.5 Using Sequential Index Values to Represent Data Chunks
   4.6 Data Transmission Context Synchronization and Recovery
   4.7 Extensions for File Version Read-Miss Scenarios
   4.8 Additional Features and Alternative Embodiments
5.0 Implementation Mechanisms—Hardware Overview
6.0 Extensions and Alternatives

1.0 General Overview

The needs identified in the foregoing Background, and other needs and objects that will become apparent for the following description, are achieved in the present invention, which comprises, in one aspect, a method for reducing network traffic. At a sender, a data chunk is identified for transmission to a receiver, which is connected to the sender over a communication link. The sender computes a signature of the data chunk and determines whether the data chunk has been previously transmitted by looking up the signature in a sender index table. The sender index table associates the signatures of previously transmitted data chunks with unique index values. A message is transmitted to the receiver, where if the data chunk has previously been transmitted then the message includes an index value from the sender index table that is associated with the signature of the data chunk. At the receiver, the data chunk is located in a receiver cache that stores the previously transmitted data chunks by looking up the index value included in the message in a receiver index table. The receiver index table associates the unique index values with the locations in the receiver cache of the previously transmitted data chunks.

In a feature of this aspect, if the data chunk has not been previously transmitted, then the message includes the data chunk in addition to the index value from the sender index table that is associated with the signature of the data chunk.

In one feature of the aspect, the sender index table comprises a first data structure stored in volatile storage that maps signatures to unique index values and a second data structure stored in persistent storage that maps unique index values to signatures, where the first data structure is created in the volatile storage based on the second data structure. The second data structure may be stored in a file that is organized in a circular buffer. In this feature, to determine whether the data chunk has been previously transmitted, the sender looks up the signature in the first data structure.

In a feature of this aspect, the receiver cache comprises one or more files stored in persistent storage, which one or more files store the previously transmitted data chunks. The receiver index table comprises a data structure stored in volatile storage. The receiver index table maps the unique index values to the locations, in the one or more files, of the previously transmitted data chunks that are associated with the unique index values.

In one aspect, a method for reducing network traffic is disclosed. At a sender, a data block is received for transmission to a receiver, where the sender and the receiver are connected over a communication link. One or more data chunks are identified in the data block. A signature is computed for each of the one or more data chunks. Then, for each of the one or more data chunks, the sender determines whether that data chunk has previously been transmitted by looking up the signature of that data chunk in a sender index table that associates signatures with unique index values. If that data chunk has not been previously transmitted, the sender creates a new index value, in the sender index table, that is associated with the signature of that data chunk. A message is created for transmitting the data block to the receiver. For each of the one or more data chunks that has previously been transmitted, the message includes the index value that is associated with the signature of that data chunk, but not that data chunk. For each of the one or more data chunks that has not been previously transmitted, the message includes that data chunk and the new index value that is associated with the signature of that data chunk. In addition, the message may include a checksum value that is independently calculated by the sender over the entire data block. The message is transmitted to the receiver. At the receiver, the data block is assembled based on the message. For each of the one or more data chunks that has previously been transmitted, that data chunk is retrieved from a receiver cache of previously transmitted data chunks. The data chunk is located in the receiver cache by looking up the index value for that data chunk received in the message in a receiver index table that associates the unique index values with the locations in the receiver cache of the previously transmitted data chunks. For each of the one or more data chunks that has not been previously transmitted, that data chunk is stored in the receiver cache. In the receiver index table, the new index value for that data chunk received in the message is associated with the location of that data chunk in the receiver cache. In addition, after the receiver assembles the data block based on the message, the receiver may verify the integrity of the data block by computing a checksum value over the assembled data block and comparing that computed checksum value to the checksum value included in the message received from the sender.

In a feature of this aspect, the sender and the receiver maintain a data transmission context. At the sender, the data transmission context comprises the sender index table. At the receiver, the data transmission context comprises the receiver cache and the receiver index table. The data transmission context is synchronized between the sender and the receiver. The synchronization of the data transmission context may include maintaining the unique index values at the sender and at the receiver, where new index values created in the sender index table are used for looking up signatures only after the receiver has acknowledged that the new index values have been stored in the receiver index table.

In this feature of the aspect, the data transmission context may be associated with one or more data blocks from one or more files, where the data block received at the sender is from a specific file of the one or more files. Further, in this feature the data transmission context may be a first data transmission context of a plurality of data transmission contexts that are maintained by the sender and the receiver.

In one feature of the aspect, the sender is a first server established on a first Local Area Network (LAN) and the receiver is a second server established on a second LAN, where the first server and the second server are communicatively connected over the communication link. The communication link may be any one of a dial-up connection, a Wide Area Network (WAN) connection, a Digital Subscriber Line (DSL) connection, and an Integrated Services Digital Network (ISDN) connection.

In this feature of the aspect, the sender may be communicatively connected to a client over the first LAN and the receiver may be communicatively connected to a file server over the second LAN. The client may send the data block to the sender as part of a write operation to a file managed by the file server. After the receiver assembles the data block, the receiver may write the data block to the file at the file server.

In this feature of the aspect, the sender may be communicatively connected to a file server over the first LAN and the receiver may be communicatively connected to a file server over the second LAN. The file server may send the data block to the sender as part of a read operation from a file managed by the file server, where the read operation is requested by the client. After the receiver assembles the data block, the receiver may send the data block to the client.

In a feature of this aspect, the steps of the disclosed method for reducing network traffic are performed as part of a file operation that conforms to a Common Internet File System (CIFS) protocol.

In one feature of the aspect, the sender receives a request from a client to perform a file operation, where the data block is received as part of the request. In this feature, the steps of the disclosed method for reducing network traffic are performed in response to receiving the request.

In a feature of this aspect, identifying the one or more data chunks in the data block further comprises the steps of: based on a sliding window of a predetermined number of bytes, calculating a fingerprint value at each byte of the data block; locating one or more breakpoints in the data block based on the fingerprint values calculated at each byte of the data block; and determining, based on the one or more breakpoints, the boundaries of the one or more data chunks of the data block.

In one feature of the aspect, the signature for each of the one or more data chunks is computed by applying a hash function to that data chunk.

In a feature of this aspect, the one or more index values associated with the one or more data chunks of the data block are sequential values that reflect the order in which the one or more data chunks appear in the data block.

In other aspects, the invention encompasses a system, a computer apparatus, and a computer-readable medium configured to carry out the foregoing steps.

2.0 Structural Overview 2.1 Operational Context of an Embodiment

FIG. 1 is a block diagram that illustrates an overview of an example operational context in which an embodiment may be implemented. This example operational context may represent portions of the network infrastructure of a geographically dispersed enterprise, in which LAN 108 is established at the main office of the enterprise, and LANs 128, 138, and 148 are established at three branch offices. The branch office LANs 128, 138, and 148 are communicatively connected to the main office LAN 108 over WAN 100. The techniques described herein may be implemented in various other operational contexts, such as, for example, an operational context in which point-to-point network traffic is exchanged over any type of one or more communication links. For this reason, the example operational context depicted in FIG. 1 is to be regarded in an illustrative rather than a restrictive sense.

In the operational context depicted in FIG. 1, core server 102 is established in LAN 108, and serves as a proxy for various services and data resources provided to remote enterprise clients by other servers established in LAN 108, such as, for example, file server 110, web server 112, and database server 114. Core server 102 is communicatively connected to edge servers 120, 130, and 140 over WAN links 121, 131, and 141, respectively.

Edge server 120 is established in LAN 128, and is communicatively connected to one or more clients, such as, for example, clients 126A and 126B. Edge server 120 serves as a proxy for the clients established in LAN 128 that need to access services and data resources provided in LAN 108. Similarly, edge servers 130 and 140 are established in LANs 138 and 148, respectively, and are communicatively connected to one or more clients established in these LANs, such as, for example, clients 136A, 136B, 146A, and 146B. Edge servers 130 and 140 serve as proxies for their respective clients that need to access services and data resources provided in LAN 108.

In FIG. 1, core server 102 and edge servers 120, 130, and 140 are designated as "core" and "edge" servers to illustrate the example operational context in which a geographically dispersed enterprise comprises a main office and one or more branch offices. However, core server 102 and edge servers 120, 130, and 140 serve as proxies for some or all of the network traffic exchanged between LAN 108 and LANs 128, 138, and 148, and perform similar functions in reducing this network traffic according to the techniques described herein. In particular, any and all of core server 102 and edge servers 120, 130, and 140 perform the functions of both senders and receivers of data, as described herein, depending on the direction of the data flow. Furthermore, each of edge servers 120, 130, and 140 may also serve as a proxy for services and data resources provided in LANs 128, 138, and 148, respectively, and core server 102 may also serve as a proxy for clients in LAN 108 that need to access the services and data resources provided in any of LANs 128, 138, and 148. Thus, the "core" and "edge" designations of servers 102, 120, 130, and 140 are used for illustrative purposes only, and do not in anyway qualify the techniques described herein unless specifically stated otherwise.

To perform the functions of a sender, core server 102 comprises a sender index table 106. To perform the functions of a receiver, core server 102 comprises a receiver cache 104 and a receiver index table 105. Similarly, to perform the functions of senders, edge servers 120, 130, and 140 comprise sender index tables 124, 134, and 144, respectively. To perform the functions of receivers, edge servers 120, 130, and 140 comprise receiver caches 122, 132, and 142, and receiver index tables 123, 133, and 143, respectively.

According to the techniques described herein, the unit of data that is designated at a sender for transmitting to a receiver is a data block. A data block may comprise any portion of a file, a data packet, or any protocol data unit that is transmitted between a sender and a receiver according to any network layer, transport layer, session layer, or application layer protocols.

In operation, suppose that a client, such as, for example, client 126A needs to write to a file maintained by a server in a remote LAN, such as, for example, file server 110.

According to the techniques described herein, client 126A sends the file in one or more data blocks to a sender, such as, for example, edge server 120. Edge server 120, functioning as a sender, identifies one or more data chunks in each data block it needs to transmit, and computes a collision-resistant strong cryptographic signature for each data chunk in each data block. For each data chunk, based on the signature computed for that data chunk, edge server 120 first attempts to locate the data chunk in sender index table 124. Sender index table 124 associates the signatures of previously transmitted data chunks with unique index values.

If edge server 120 finds the signature of a data chunk in sender index table 124, then the index value associated with the data chunk is to be sent to core server 102 instead of the whole data chunk. If edge server 120 does not find the signature of a data chunk in the sender index table 124, then edge server 120 adds a new entry in sender index table 124 for that data chunk. The new entry associates a new index value with the signature of the data chunk. Edge server 120 then designates for sending to core server 102 the data chunk and the new index value that is associated with the signature of the data chunk.

After processing in this manner all data chunks identified in a data block that needs to be transmitted to core server 102, edge server 120 creates a message for transmitting the data block. For each data chunk, for which the signature is found in sender index table 124, the message includes the index value associated with the signature of the data chunk. For each data chunk, for which the signature is not found in sender index table 124, the message includes the data chunk and the new index value that is added to sender index table 124 for that data chunk. In some embodiments, edge server 120 may also compute a checksum value over the entire data block that is designated for transmission, and may include that checksum value in the message that is to be transmitted to core server 102.

Edge server 120 then transmits the message to core server 102. Since the message includes only index values in the place of previously transmitted data chunks, the message is much smaller in size than it would be if the content of the entire data block is transmitted.

Upon receipt of the message, core server 102 assembles the data block based on the message. For each data chunk for which only an index value is included in the message, core server 102 uses the index value to perform a look up in receiver index table 105. Receiver index table 105 associates index values, which are associated with previously transmitted data chunks, with the locations in receiver cache 104 of the previously transmitted data chunks. Thus, by using the index values received in the message, core server 102 is able to find in receiver cache 104 the particular data chunk that is associated with the index value (and that has previously been transmitted).

For each data chunk for which the message includes the data chunk and an index value, core server 102 knows that this data chunk has not been previously transmitted (otherwise the sender would not have included the data chunk itself in the message). Core server 102 stores the data chunk in receiver cache 104, and adds a new entry to receiver index table 105. The new entry in receiver index table 105 associates the index value, which is received with the data chunk in the message, with the location of the data chunk in receiver cache 105. In some embodiments, after a receiver has made a new entry in the receiver index table, the receiver sends an acknowledgement to notify the sender that the newly transmitted data chunk has been properly processed at the receiver, and that the sender may now use the index value instead of the data chunk when the data chunk needs to be transmitted again.

Once core server 102 has obtained each data chunk of the transmitted data block (either from the message for newly transmitted data chunks, or from receiver cache 104 for previously transmitted data chunks), core server 102 assembles the data block and writes the data block to the file maintained by file server 110. In some embodiments, after assembling the data block, core server 102 may compute a checksum value over the assembled data block. Core server 102 may then compare this computed checksum value to the checksum value included in the message in order to verify the integrity of the assembled data block.

According to the techniques described herein, both the sender and the receiver keep a record of previously transmitted data chunks—the sender keeps a sender index table that associates the signatures of these data chunks with unique index values, and the receiver keeps a cache of these previously transmitted data chunks and a receiver index table that associates the unique index values with locations in the cache of these data chunks. Furthermore, the unique index values are synchronized between the sender and the receiver, where the sender and the receiver maintain the same set of unique index values each of which corresponds to the same previously transmitted data chunk. In this way, the sender operates in an efficient manner because it does not keep a cache of any previously transmitted data chunks, while the receiver becomes highly scalable because the receiver cache of previously transmitted data chunks is efficiently accessible through the index values received in the messages from the sender.

2.2 Synchronized Data Transmission Context

In one embodiment, the sender and the receiver maintain a synchronized data transmission context. The data transmission context may be associated with data chunks belonging to one or more data blocks of one or more files, or of one or more data packets, slated for transmission between the sender and the receiver. Further, data transmission contexts are uni-directional. That is, between two entities, such as servers, that can be both senders and receivers, one data transmission context may apply when one of the servers is a sender, and another data transmission context may apply when that same server is a receiver.

A data transmission context represents a relationship between a sender and a receiver, which relationship may be associated with, and determined by, one or more criteria. The one or more criteria may be based on properties of the data chunks that are associated with the data transmission context, on properties associated with the sender and/or the receiver, on properties associated with the entities that use the sender as a proxy for transmitting data to the receiver, or on any other arbitrary parameters that may be specified by a user in one or more rules or policies.

For example, a sender and a receiver may maintain one data transmission context for all clients that use the sender as a proxy for sending data to the receiver. In this example, the sender and the receiver may use the same data transmission context to support the transmission of data chunks from all clients regardless of the content of the data. Alternatively, the sender and the receiver may maintain one or more data transmission contexts to support the transmission of data chunks from all clients, where the one or more data transmission contexts are associated with one or more specific types of data content, such as, for example, data, voice, video, etc. In other words, these one or more data transmission contexts are content-specific but not client-specific.

In another example, a sender and a receiver may maintain separate data transmission contexts for each client that uses the sender as a proxy for sending data chunks to the receiver. In other words, the sender and the receiver may maintain client-specific data transmission contexts. In a different example, a sender and a receiver may maintain separate data transmission contexts for each particular user that uses the sender as a proxy for sending data chunks to the receiver. In other words, the sender and the receiver may maintain user-specific data transmission contexts. In a yet different example, a sender and a receiver may maintain separate data transmission contexts for each particular software application that uses the sender as a proxy for sending data chunks to the receiver. In addition, these application-specific data transmission contexts may also be content-specific, client-specific, and/or user-specific.

At the sender, a data transmission context comprises a sender index table, which maps data chunk signatures to index values. The mapping of signatures to index values is also referred to herein as a "sender dictionary". At the receiver, the data transmission context comprises a receiver index table, which maps index values to the locations of previously transmitted data chunks in a receiver cache. The mapping of index values to data chunks is also referred to herein as a "receiver dictionary."

In some embodiments, the receiver cache may be part of the data transmission context, and may be specific to that particular data transmission context. In other embodiments, the receiver cache may not be specific to a particular data transmission context, and may store previously transmitted data chunks from a plurality of data transmission contexts.

In one embodiment, a data transmission context is identified by a context identifier. One parameter associated with a data transmission context may be an index range, which identifies the lowest and highest index values associated with data chunks that are transmitted between a sender and a receiver within the data transmission context. Another parameter associated with a data transmission context may be a total context size, which specifies the total allocated, or the maximum allowed, storage size for the context. Another parameter associated with a data transmission context may be an average chunk size, which specifies the average size of data chunks associated with the context.

In one embodiment, a data transmission context between a sender and a receiver is synchronized in the following manner. The data transmission context is initially empty. When a sender wishes to transmit a data block to a receiver, it first attempts to locate the one or more data chunks of the data block in its sender index table based on signatures computed for the data chunks. Since the data transmission context is empty, the sender adds the one or more data chunks to the data transmission context by adding an entry to the sender index table for each data chunk, where an entry associates the signature of a data chunk with a unique index value. The sender then transmits to the receiver the one or more data chunks and the index values associated with the data chunks' signatures. Upon receipt of the message, the receiver stores the one or more data chunks in its receiver cache, and adds an entry to its receiver index table for each received data chunk. Each entry associates the index value received in the message with the location in the receiver cache of the corresponding data chunk. In some embodiments, after creating a new entry in the receiver index table, the receiver may send an acknowledgement to the sender to signal that the newly transmitted data chunks and the index values associated with them have been properly processed at the receiver.

This process of indexing at the sender and at the receiver is repeated for each newly transmitted data chunk from the sender to the receiver. In this way, since the sender indexes each data chunk that is transmitted, and since the receiver keeps its receiver cache of previously transmitted data chunks synchronized to the sender index table, no index conflicts may occur.

In one embodiment, upon connecting to each other, a sender and a receiver may initialize and subsequently use an existing data transmission context that is not empty. A sender may initiate a context negotiation for an existing data transmission context by sending to the receiver a special message. The message may include one or more parameters associated with the existing data transmission context, such as, for example, a context identifier, an index range, and an allocated context size. The receiver's response to this message may indicate whether the context identifier received from the sender matches a data transmission context previously saved by the receiver, and, if the context identifier matches a previously saved data transmission context, whether the received index range matches the index range of this previously saved data transmission context.

In some embodiments, if the sender and the receiver identify through a context identifier a previously used data transmission context, but the index ranges kept by the sender and the receiver for the data transmission context do not match, the sender and the receiver may negotiate the smallest span of index values for which the index ranges kept by the sender and the receiver match. Alternatively, when the sender and the receiver determine that the index ranges kept by each of them are off by more than a predetermined number (such as, for example, more than 1, 10, or 10,000 entries apart), the sender and the receiver may decide to initialize a new empty data transmission context that is identified by a new context identifier.

In some embodiments, the sender and the receiver may additionally synchronize the data transmission context by periodically exchanging the lowest and highest index values of the index ranges kept by each of them. If the exchange of the lowest and highest index values indicates that the index ranges for the data transmission context are not identical at the sender and at the receiver, the sender and the receiver may adjust these top and bottom values so that both of the sender and the receiver have the smallest common span of index values. In addition, if the receiver needs to purge some index values from its receiver index table, the receiver also may need to purge the corresponding data chunks from its receiver cache.

A synchronized data transmission context as described herein simplifies the support of interactive write operations because it preserves the order in which a client (that is communicatively connected to the sender) writes data blocks to a server (that is communicatively connected to the receiver). Without synchronization, the sender can only make a best-effort to send data chunks and signatures to the receiver; if there is no match at the receiver the receiver will have to ask for the data. By the time that data arrives, a later write operation sent by the client may have reached the server and may have succeeded, which results in a violation of the order in which write operations sent from the client must be performed on the server. A synchronized data transmission context avoids this problem because at any point both the sender and the receiver are aware of what data has been received and acknowledged by the receiver.

2.3 Structural Elements According to an Embodiment

Figure 2A:
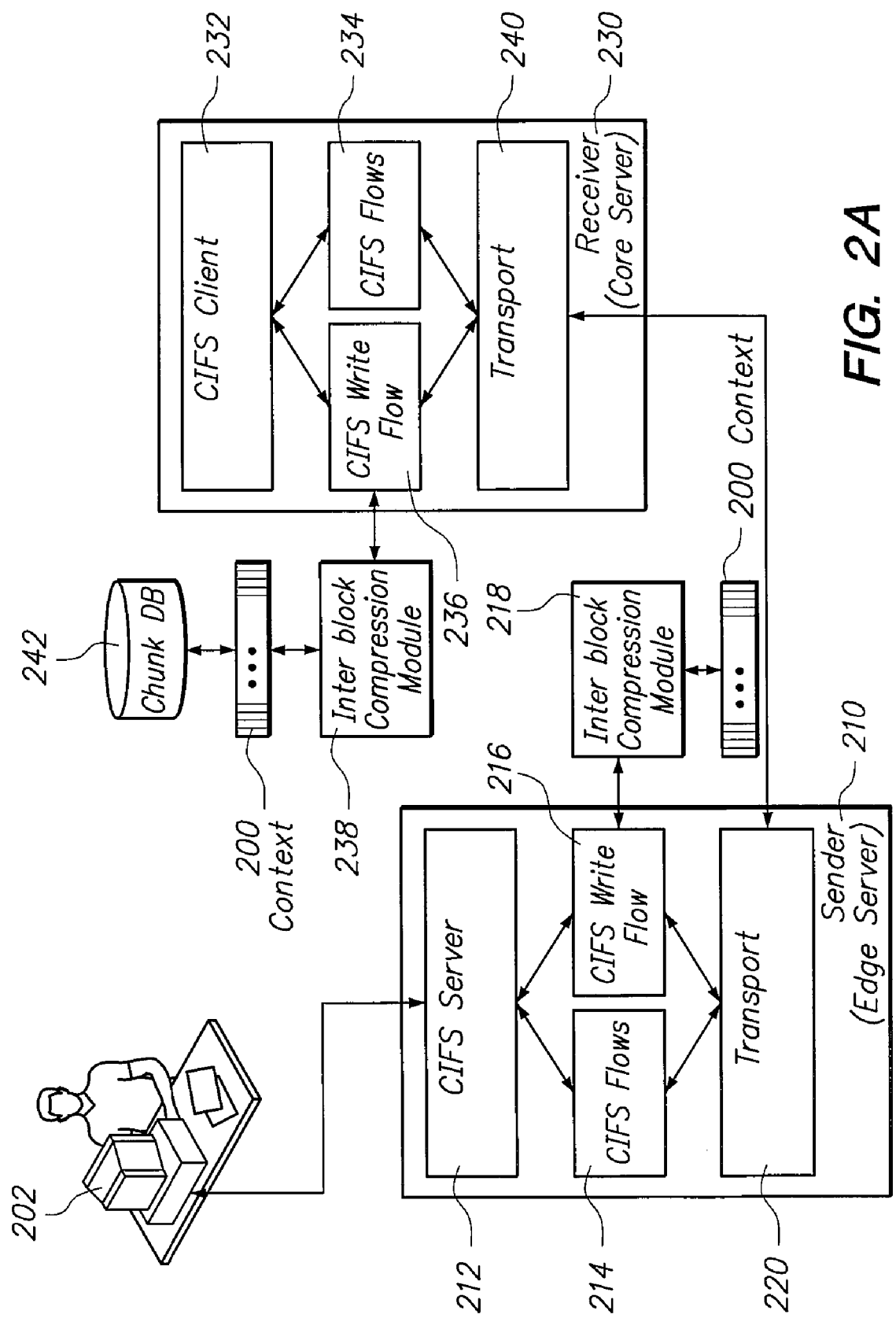
FIG. 2A is a block diagram that illustrates modules and components used in one embodiment to perform a file write operation.

FIG. 2A is a block diagram that illustrates modules and components used in one embodiment to perform a file write operation that conforms to a Common Internet File System (CIFS) protocol.

CIFS is a remote file system access protocol that provides file-sharing services over a network. The CIFS protocol is based on a client-server design, where a CIFS client sends request packets to a CIFS server, and the CIFS server responds back to the CIFS client with response packets. Each request packet that is sent from the CIFS client includes a command code and one or more operations that are to be performed by the CIFS server. Different command codes are associated with different types of operations, such as, for example, operations for establishing a CIFS session between a CIFS client and a CIFS server, operations for authenticating a CIFS client and/or user of the client, operations for opening a file, operations for reading a file, operations for writing a file, and operations for disconnecting a CIFS session. Flows of packets that carry operations associated with different command codes are referred to herein as "CIFS flows." Examples of such CIFS flows include, but are not limited to, a CIFS session flow, a CIFS authentication flow, a CIFS open flow, a CIFS read flow, and a CIFS write flow.

In FIG. 2A, client 202 receives from a user a request to write a data block to a file that is managed by a file server in a remote LAN, in which receiver 230 is established. Client 202 sends this file write operation to CIFS server 212. CIFS server 212 executes as a component of sender 210, which may be, for example, edge server 120 depicted in FIG. 1. Sender 210 also executes inter-block compression module 218, transport module 220, CIFS write flow module 216 for processing CIFS write flows, and one or more other modules, such as module 214, for processing other CIFS flows.

In response to receiving the data block from client 202, CIFS server 212 determines the CIFS flow of which the data block is part of, and passes the data block to the corresponding CIFS flow module. Since the data block received from client 202 is part of a file write operation, CIFS server 212 passes the data block to CIFS write flow module 216.

CIFS write flow module 216 determines whether the data block is subject to inter-block compression. Inter-block compression is a term that refers to the techniques for reducing network traffic described herein. If the data block is not subject to inter-block compression, then the data block is processed by CIFS write flow module 216 in the normal way. If the data block is subject to inter-block compression, it is passed to inter-block compression module 218 for further processing in accordance with the techniques for reducing network traffic described herein.

Inter-block compression module 218 is communicatively and/or operatively connected to context 200. Context 200 is data transmission context that is synchronized between sender 210 and receiver 230. At sender 210, context 200 comprises a sender index table. Context 200. The sender index table associates unique index values with the signatures of previously transmitted data chunks. In response to receiving the data block from CIFS write flow module 216, inter-block compression module 218 identifies one or more data chunks in the data block by using a data-dependant chunking algorithm, an example of which is described hereinafter. A collision-resistant cryptographic signature is computed for each data chunk and the signature of each data chunk is used to perform a lookup in the sender index table of context 200. A match between the signature of a particular data chunk and an entry in the sender index table indicates that the particular data chunk has been previously been transmitted. In this case, inter-block compression module 218 retrieves the index value associated with the signature. If the signature of a particular data chunk does not match an entry in the sender index table of context 200, inter-block compression module 218 assigns a new index value to the particular data chunk, and stores the new index value and the signature of the particular data chunk as an entry in the sender index table. In some embodiments, signatures associated with newly assigned index values may not be used for look-ups and matching until the receiver has acknowledged the receipt of the new index values.

After inter-block compression module 218 has processed in this manner each of the one or more data chunks identified in the data block, the module creates a vector representing the one or more data chunks, where each entry in the vector includes either an index value (if the data chunk corresponding to the entry has previously been transmitted), or the data chunk and the new index value associated with the signature of that data chunk (if that data chunks has not previously been transmitted). Inter-block compression module 218 then passes this "write" vector in a Remote Procedure Call (RPC) message to transport module 220 for transmission to the transport module 240 that is executing on receiver 230.

In addition to transport module 240, receiver 230 executes CIFS client 232, inter-block compression module 238, CIFS write flow module 236, and one or more other modules, such as module 234, for processing other CIFS flows. Receiver 230 may be a server, such as, for example, core server 102 in FIG. 1.

After receiving the RPC message, transport module 240 unpacks the message and retrieves the write vector included therein. Transport module 240 then sends the write vector to CIFS write flow module 236. CIFS write flow module 236 determines that the write vector represents a compressed data block, and passes the vector to inter-block compression module 238.

Inter-block compression module 238 is communicatively and/or operatively connected to context 200. At receiver 230, context 200 comprises a receiver index table and a chunk database 242. Chunk database 242 stores data chunks that have previously been transmitted from sender 210. The receiver index table associates index values with the locations in chunk database 242 of the previously transmitted data chunks.

After receiving the write vector from CIFS write flow module 236, inter-block compression module 238 assembles the data block based on the data chunks and the index values included in the vector. For each entry in the write vector that includes only an index value, inter-block compression module 238 uses the index value to look up, in the receiver index table, the location in chunk database 242 of a previously transmitted data chunk that corresponds to the entry. Inter-block compression module 238 then retrieves the data chunk from the location in chunk database 242. For each entry in the write vector that includes a data chunk and an index value, inter-block compression module 238 stores the data chunk in chunk database 242. Inter-block compression module 238 then creates a new entry in the receiver index table, which new entry associates the index value received in the write vector with the location of the corresponding data chunk in chunk database 242.

Once inter-block compression module 238 has processed every entry in the received write vector in this manner, the module assembles, or reconstructs, the original data block by putting together the one or more data chunks in the order they are represented by the entries of the write vector. The assembled block is passed back to CIFS write flow module 236, which in turn passes it to CIFS client 232. CIFS client 232 sends the data block for writing to the target file at the file server.

In some embodiments, the file server acknowledges the success of the file write operation to the receiver's CIFS client. In these embodiments, the receiver sends to the sender the result of the file write operation along with an acknowledgement that the new data chunks included in the data block are processed at the receiver and are valid for future use.

Figure 2B:
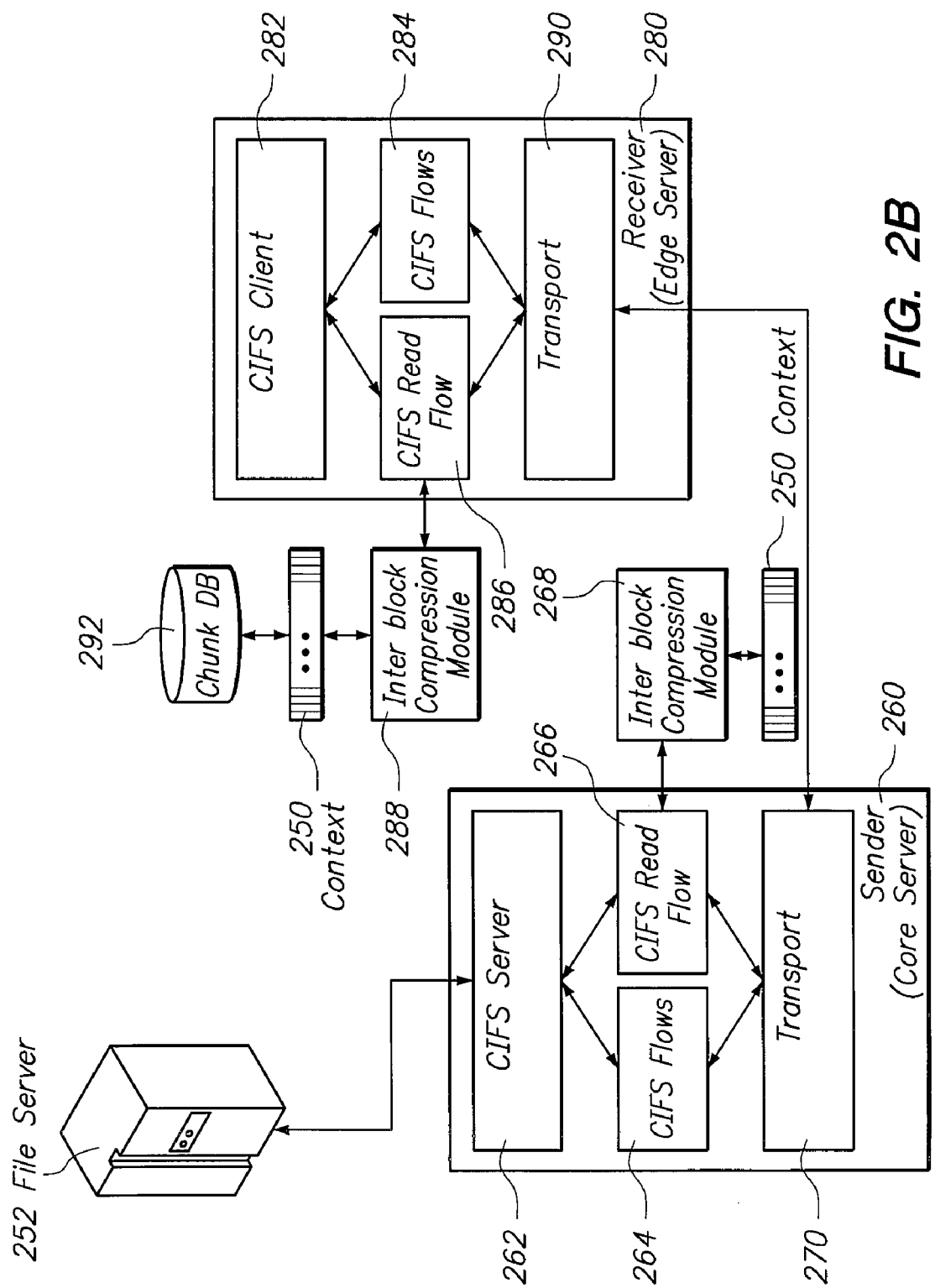
FIG. 2B is a block diagram that illustrates modules and components used in one embodiment to perform a file read operation.

FIG. 2B is a block diagram that illustrates modules and components used in one embodiment to perform a file read operation that conforms to a CIFS protocol.

File server 252 receives from a user in a remote LAN, in which receiver 280 is established, a request to read a data block from a file that is managed by the file server. File server 252 retrieves the requested data block, and sends it to the CIFS server 262 that executes as a component of sender 260.

Sender 260 may be a server, such as, for example, core server 102 that is depicted in FIG. 1. As depicted in FIG. 2B, in addition to CIFS server 262, sender 260 also executes inter-block compression module 268, transport module 270, CIFS read flow module 266 for processing CIFS read flows, and one or more other modules, such as module 264, for processing other CIFS flows.

In response to receiving the data block from file server 252, CIFS server 262 passes the data block to CIFS read flow module 266 since the data block is received from file server 252 as part of a file read operation. CIFS read flow module 266 determines whether the data block is subject to inter-block compression. If the data block is not subject to inter-block compression, then the data block is processed by CIFS read flow module 266 in the normal way. If the data block is subject to inter-block compression, it is passed to inter-block compression module 268 for further processing in accordance with the techniques for reducing network traffic described herein.

Inter-block compression module 268 is communicatively and/or operatively connected to context 250. Context 250 is data transmission context that is synchronized between sender 260 and receiver 280. At sender 260, context 250 comprises a sender index table. The sender index table associates unique index values with the signatures of previously transmitted data chunks. In response to receiving the data block from CIFS read flow module 266, inter-block compression module 268 identifies one or more data chunks in the data block by using a data-dependant chunking algorithm, and computes a collision-resistant cryptographic signature for each data chunk. CIFS read flow module 266 then uses the signature of each data chunk to perform a lookup in the sender index table of context 250. A match between the signature of a particular data chunk and an entry in the sender index table indicates that the particular data chunk has been previously been transmitted. In this case, inter-block compression module 268 retrieves the index value associated with the signature. If the signature of a particular data chunk does not match an entry in the sender index table of context 250, inter-block compression module 268 assigns a new index value to the particular data chunk, and stores the new index value and the signature of the particular data chunk as an entry in the sender index table.

After inter-block compression module 268 has processed in this manner each of the one or more data chunks identified in the data block, the module creates a vector representing the one or more data chunks, where each entry in the vector includes either an index value (if the data chunk corresponding to the entry has previously been transmitted), or the data chunk and the new index value associated with the signature of that data chunk (if that data chunks has not previously been transmitted). Inter-block compression module 268 then passes this "read" vector in a Remote Procedure Call (RPC) message to transport module 270 for transmission to the transport module 290 that is executing on receiver 280.

In addition to transport module 290, receiver 280 executes CIFS client 282, inter-block compression module 288, CIFS read flow module 286, and one or more other modules, such as module 284, for processing other CIFS flows. Receiver 280 may be a server, such as, for example, edge server 120 in FIG. 1.

After receiving the RPC message, transport module 290 unpacks the message and retrieves the read vector included therein. Transport module 290 then sends the read vector to CIFS read flow module 286. CIFS read flow module 286 determines that the read vector represents a compressed data block, and passes the vector to inter-block compression module 288.

Inter-block compression module 288 is communicatively and/or operatively connected to context 250. At receiver 280, context 250 comprises a receiver index table and a chunk database 292. Chunk database 292 stores data chunks that have previously been transmitted from sender 260. The receiver index table associates index values with the locations in chunk database 292 of the previously transmitted data chunks.

After receiving the read vector from CIFS read flow module 286, inter-block compression module 288 assembles the data block based on the data chunks and the index values included in the vector. For each entry in the read vector that includes only an index value, inter-block compression module 288 uses the index value to look up, in the receiver index table, the location in chunk database 292 of a previously transmitted data chunk that corresponds to the entry. Inter-block compression module 288 then retrieves the data chunk from the location in chunk database 292. For each entry in the read vector that includes a data chunk and an index value, inter-block compression module 288 stores the data chunk in chunk database 292. Inter-block compression module 288 then creates a new entry in the receiver index table, which new entry associates the index value received in the read vector with the location of the corresponding data chunk in chunk database 292.

Once inter-block compression module 288 has processed every entry in the received read vector in this manner, the module assembles, or reconstructs, the original data block by putting together the one or more data chunks in the order they are represented by the entries of the read vector. The assembled block is passed back to CIFS read flow module 286, which in turn passes it to CIFS client 282. CIFS client 282 sends the data block to the network client through which the user requested the data block.

In some embodiments, the network client acknowledges the success of the file read operation to the receiver's CIFS client. In these embodiments, the receiver sends to the sender the result of the file read operation along with an acknowledgement that the new data chunks included in the data block are processed at the receiver and are valid for future use. In this embodiment, the sender begins using the signatures associated with newly assigned index values for look-ups and matching only after it received the acknowledgement from the receiver.

3.0 Functional Overview

The techniques described herein may be implemented by a sender and a receiver that are connected over a communication link. The sender is an entity that is capable of transmitting data over the communication link, and the receiver is an entity that is capable of receiving data that is transmitted over the communication link. The sender and the receiver may be any type of hardware or software entities including, but not limited to, hardware devices, systems that comprise both hardware and software components, and purely software entities, such as, for example, services, processes, or applications. The communication link over which the sender transmits data to the receiver may be any communication link including, but not limited to, a network connection, a DSL or ISDN connection, a dial-up connection, or a wireless connection. While some embodiments described herein are implemented over low bandwidth communication links, the described techniques for reducing network traffic are not limited to being dependant on any specific type of a communication link. For this reason, the embodiments described herein are to be regarded in an illustrative rather than a restrictive sense.

Figure 3A:
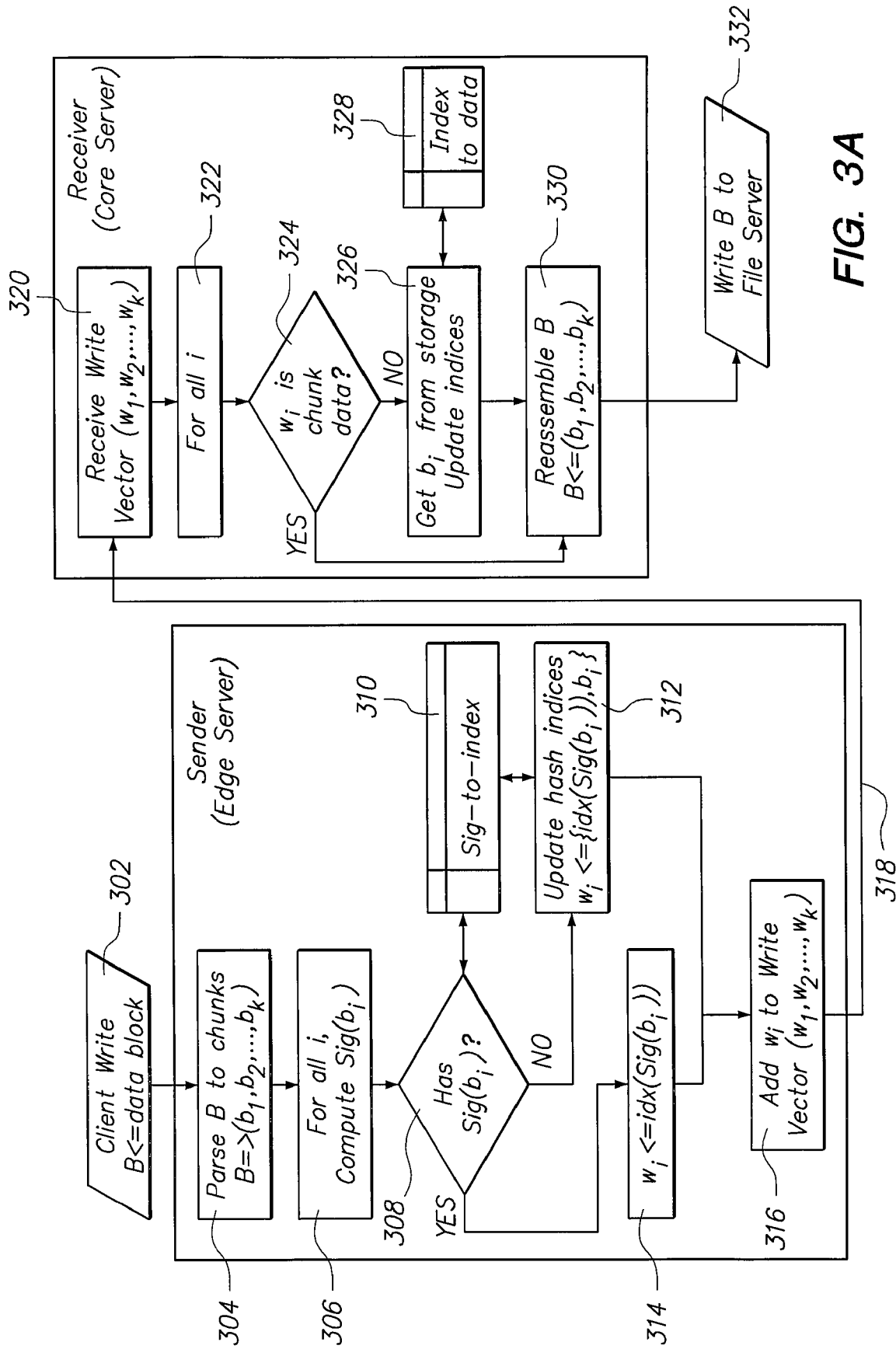
FIG. 3A is a flow diagram that illustrates a high level overview of one embodiment of a method for reducing network traffic for a file write operation.

FIG. 3A is a flow diagram that illustrates a high level overview of one embodiment of a method for reducing network traffic for a file write operation.

Steps 302 to 318 depicted in FIG. 3A are performed at a sender, such as, for example, edge server 120 of FIG. 1, and steps 320 to 332 are performed at a receiver, such as, for example, core server 102 of FIG. 1.

In step 302 of FIG. 3A, a client that is communicatively and/or operatively connected to the sender, sends data block B for writing to a target file that is managed by a file server, which is communicatively and/or operatively connected to the receiver.

In step 304, data block B is parsed into one or more data chinks, such as, for example, data chunks ($b_1, b_2, \ldots, b_k$). For example, a data-dependant chunking algorithm may be used to identify one or more delimiters in the data block, and the boundaries of the data chunks are determined based on the one or more delimiters.

In step 306, a signature is computed for each data chunk of the one or more data chunks ($b_1, b_2, \ldots, b_k$). In one embodiment, each signature is computed by applying a collision-resistant cryptographic signature to the bytes in the particular data chunk ($b_i$). In step 308, each computed signature is compared to the entries of sender index table 310. The sender index table 310 includes entries that map signatures to index values, where the signatures are signatures of previously transmitted data chunks and the index values are unique numeric values. The index values in sender index table 310 are synchronized with the index values in receiver index table 328.

If in step 308 a match is not found in sender index table 310 for a particular signature Sig($b_i$) of a particular data chunk ($b_i$), in step 312 a new entry is created in sender index table 310. The new entry associates the signature Sig($b_i$) of the particular data chunk ($b_i$) with a unique index value idx(Sig($b_i$)). The particular data chunk ($b_i$) and its index value idx(Sig($b_i$)) are then passed to step 316, in which a write vector ($w_1, w_2, \ldots, w_k$) is constructed. The entries in the write vector correspond to the order in which the data chunks ($b_1, b_2, \ldots, b_k$) appear in the data block B, where each entry in the write vector corresponds to one data chunk. If in step 308 the particular signature Sig($b_i$) of a particular data chunk ($b_i$) is not found in sender index table 310, then in step 316 the write vector entry ($w_i$) corresponding to data chunk ($b_i$) is set to include the data chunk ($b_i$) and the index value idx(Sig($b_i$)) that is associated with signature of the data chunk ($b_i$).

If in step 308 a match is found in sender index table 310 for a particular signature Sig($b_i$) of a particular data chunk ($b_i$), in step 314 the index value idx(Sig($b_i$)), which is associated with the signature Sig($b_i$) of the particular data chunk, is retrieved from the sender index table 310. In step 316 the write vector entry ($w_i$) corresponding to the particular data chunk ($b_i$) is set to include the index value idx(Sig($b_i$)), but not the data chunk ($b_i$) itself.

Once all data chunks ($b_1, b_2, \ldots, b_k$) identified in data block B have been processed in this way, the constructed write vector ($w_1, w_2, \ldots, w_k$) is transmitted to the receiver in step 318. In some embodiments, the write vector may be transmitted to the receiver in a message that includes a checksum value computed over the entire data block B that is being transmitted. The receiver may use this checksum value to verify the integrity the data block that is to be assembled at the receiver based on the write vector.

The write vector ($w_1, w_2, \ldots, w_k$) is received at the receiver in step 320.

In step 322, for all entries of the write vector ($w_1, w_2, \ldots, w_k$), the receiver performs step 324. In step 324, the receiver determines whether a particular entry ($w_i$) includes the particular data chunk ($b_i$) to which the entry corresponds. If in step 324 it is determined that a particular entry ($w_i$) of write vector ($w_1, w_2, \ldots, w_k$) includes the corresponding particular data chunk ($b_i$) along with its index value idx(Sig(($b_i$)), the particular data chunk ($b_i$) is stored in a receiver cache of previously transmitted data chunks and a new entry is created in receiver index table 328. Receiver index table 328 includes entries that map index values to the locations in a receiver cache of previously transmitted data chunks. Thus, the new entry in receiver index table 328 associates the index value idx(Sig($b_i$)) of the particular data chunk ($b_i$) with the location in the receiver cache where data chunk ($b_i$) is stored. The particular data chunk ($b_i$) is then passed to step 330.

If in step 324 it is determined that a particular entry ($w_i$) of write vector ($w_1, w_2, \ldots, w_k$) does not include the corresponding data chunk ($b_i$) but only includes the index value idx(Sig(($b_i$)), then in step 326 the index value idx(Sig($b_i$)) is looked up in receiver index table 328. Based on the index value, the location of data chunk ($b_i$) in the receiver cache is determined, and data chunk ($b_i$) is retrieved from the receiver cache. The retrieved data chunk ($b_i$) is then passed to step 330.

After all entries in write vector ($w_1, w_2, \ldots, w_k$) are processed in this manner, in step 330 the data block B is assembled based on the data chunks that correspond to the entries of the write vector. In some embodiments, after assembling the data block B, the receiver may compute a checksum value over the assembled data block. The receiver may then verify the integrity of the assembled data block by comparing the computed checksum value to the checksum value for data block B that is received in the message along with the write vector. In step 332, the receiver passes the assembled data block B to the file server for writing to the target file.

Figure 3B:
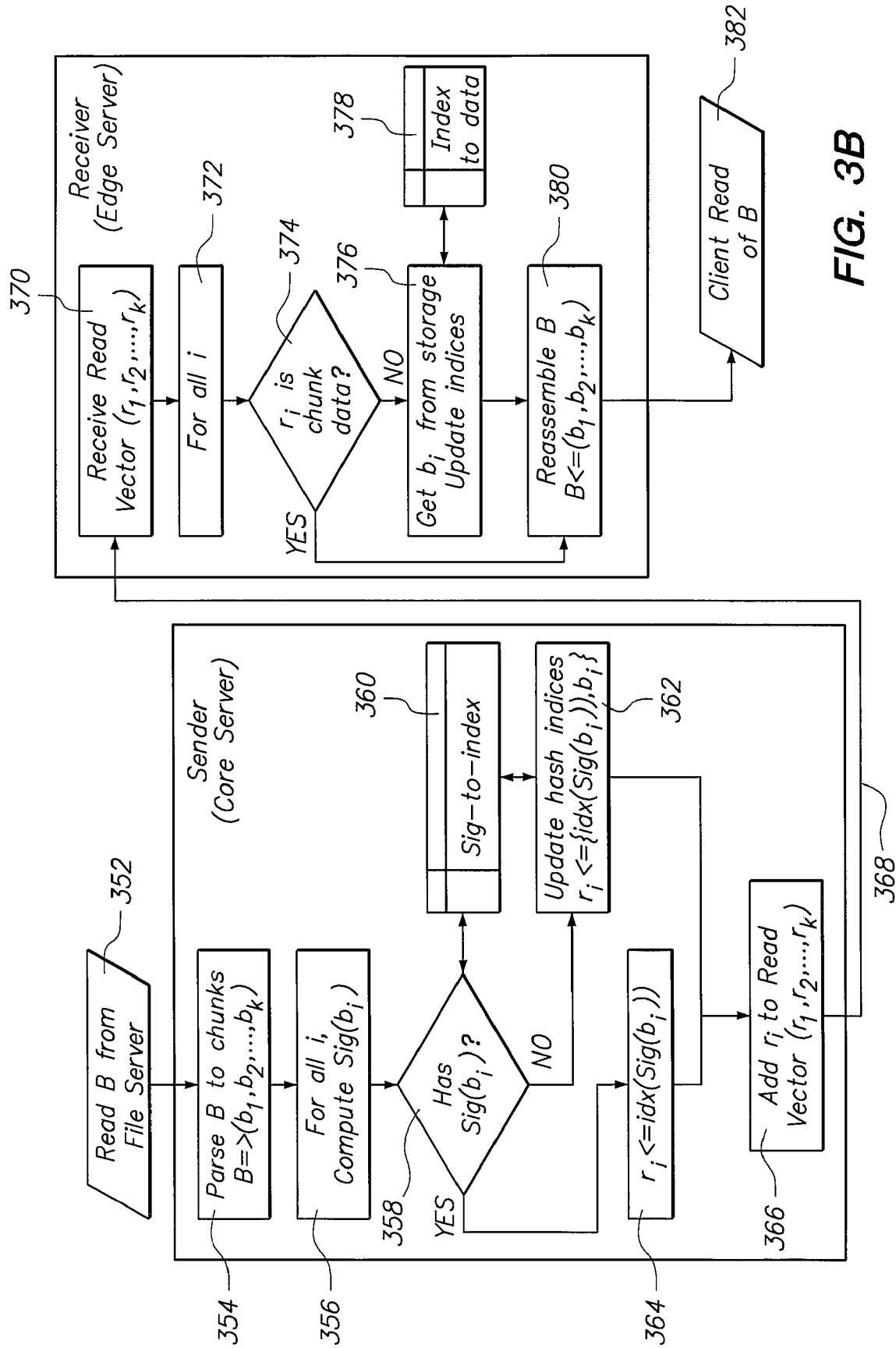
FIG. 3B is a flow diagram that illustrates a high level overview of one embodiment of a method for reducing network traffic for a file read operation.

FIG. 3B depicts a similar flow diagram that illustrates a high level overview of one embodiment of a method for reducing network traffic for a file read operation.

Steps 352 to 368 depicted in FIG. 3B are performed at a sender, such as, for example, core server 102 of FIG. 1, and steps 370 to 382 are performed at a receiver, such as, for example, edge server 120 of FIG. 1.

In step 352 of FIG. 3B, a data block B is read from a file managed by a file server, which is communicatively and/or operatively connected to the sender, in response to a request for the data block from a client, which is communicatively and/or operatively connected to the receiver.

In step 354, data block B is parsed into one or more data chinks, such as, for example, data chunks ($b_1, b_2, \ldots, b_k$). For example, a data-dependant chunking algorithm may be used to identify one or more delimiters in the data block, and the boundaries of the data chunks are determined based on the one or more delimiters.

In step 356, a signature is computed for each data chunk of the one or more data chunks ($b_1, b_2, \ldots, b_k$). In step 358, each computed signature is compared to the entries of sender index table 360. The sender index table 360 includes entries that map signatures to index values, where the signatures are signatures of previously transmitted data chunks and the index values are unique numeric values. The index values in sender index table 360 are synchronized with the index values in receiver index table 378.

If in step 358 a match is not found in sender index table 360 for a particular signature $Sig(b_i)$ of a particular data chunk ($b_i$), in step 362 a new entry is created in sender index table 360. The new entry associates the signature $Sig(b_i)$ of the particular data chunk ($b_i$) with a unique index value idx(Sig($b_i$)). The particular data chunk ($b_i$) and its index value idx(Sig($b_i$)) are then passed to step 366, in which a read vector ($r_1, r_2, \ldots, r_k$) is constructed. The entries in the read vector correspond to the order in which the data chunks ($b_1, b_2, \ldots, b_k$) appear in the data block B, where each entry in the read vector corresponds to one data chunk. If in step 358 the particular signature $Sig(b_i)$ of a particular data chunk ($b_i$) is not found in sender index table 360, then in step 366 the read vector entry ($r_i$) corresponding to data chunk ($b_i$) is set to include the data chunk ($b_i$) and the index value idx(Sig($b_i$)) that is associated with signature of the data chunk ($b_i$).

If in step 358 a match is found in sender index table 360 for a particular signature $Sig(b_i)$ of a particular data chunk ($b_i$), in step 364 the index value idx(Sig($b_i$)), which is associated with the signature $Sig(b_i)$ of the particular data chunk, is retrieved from the sender index table 360. In step 366 the read vector entry ($r_i$) corresponding to the particular data chunk ($b_i$) is set to include the index value idx(Sig($b_i$)), but not the data chunk ($b_i$) itself.

Once all data chunks ($b_1, b_2, \ldots, b_k$) identified in data block B have been processed in this way, the constructed read vector ($r_1, r_2, \ldots, r_k$) is transmitted to the receiver in step 368. In some embodiments, the read vector may be transmitted to the receiver in a message that includes a checksum value computed over the entire data block B that is being transmitted. The receiver may use this checksum value to verify the integrity the data block that is to be assembled at the receiver based on the read vector.

The read vector ($r_1, r_2, \ldots, r_k$) is received at the receiver in step 370.

In step 372, for all entries of the read vector ($r_1, r_2, \ldots, r_k$), the receiver performs step 374. In step 374, the receiver determines whether a particular entry ($r_i$) includes the particular data chunk ($b_i$) to which the entry corresponds. If in step 374 it is determined that a particular entry ($r_i$) of read vector ($r_1, r_2, \ldots, r_k$) includes the corresponding particular data chunk ($b_i$) along with its index value idx(Sig(($b_i$)), the particular data chunk ($b_i$) is stored in a receiver cache of previously transmitted data chunks and a new entry is created in receiver index table 378. Receiver index table 378 includes entries that map index values to the locations in a receiver cache of previously transmitted data chunks. Thus, the new entry in receiver index table 378 associates the index value idx(Sig($b_i$)) of the particular data chunk ($b_i$) with the location in the receiver cache where data chunk ($b_i$) is stored. The particular data chunk ($b_i$) is then passed to step 380.

If in step 374 it is determined that a particular entry ($r_i$) of read vector ($r_1, r_2, \ldots, r_k$) does not include the corresponding data chunk ($b_i$) but only includes the index value idx(Sig(($b_i$)), then in step 376 the index value idx(Sig($b_i$)) is looked up in receiver index table 378. Based in the index value, the location of data chunk ($b_i$) in the receiver cache is determined, and data chunk ($b_i$) is retrieved from the receiver cache. The retrieved data chunk ($b_i$) is then passed to step 380.

After all entries in read vector ($r_1, r_2, \ldots, r_k$) are processed in this manner, in step 380 the data block B is assembled based on the data chunks that correspond to the entries of the read vector. In some embodiments, after assembling the data block B, the receiver may compute a checksum value over the assembled data block. The receiver may then verify the integrity of the assembled data block by comparing the computed checksum value to the checksum value for data block B that is received in the message along with the read vector. In step 382, the receiver passes the assembled data block B to the client.

The techniques described herein may be implemented on any type of data that is transmitted from a sender to a receiver. Furthermore, the techniques described herein are not limited to supporting any particular types of operations that are performed remotely on any data resources. For this reason, the example embodiments described herein for reducing network traffic caused by file read and write operations are to be regarded in an illustrative rather than a restrictive sense.

4.0 Method of Reducing Network Traffic

The techniques for reducing network traffic described herein may be implemented in a variety of operational contexts. For example, in the operational context depicted in FIG. 1, the clients in LANs 128, 138, and 148 may be executing Microsoft Windows® applications. The users utilizing these applications may be accessing files stored on servers in the remote (from the user's perspective) LAN 108. Further, some applications (such as, for example, Microsoft Windows®) need to propagate changes to the files as soon as such changes are received from a user. The techniques for reducing network traffic described herein provide support for such applications because any data blocks received at a sender are processed and propagated to the receiver immediately without the need to wait for the applications to close the file being modified first.

4.1 Identifying Data Chunks in a Data Block

In one embodiment, a content-based chunking algorithm is used to identify data chunks in a data block. In this embodiment, the chunking algorithm is based on the Rabin fingerprinting technique described in Michael O. Rabin, *Fingerprinting by Random Polynomials*, Technical Report TR-15-81, Center for Research in Computing Technology, Harvard University, 1981.

In this embodiment, the chunking algorithm provides for one or more of the following functionalities: (1) splitting long data blocks or files into data chunks of either fixed size or sizes distributed around a desired chunk size; (2) allocating a previously known data chunk within a long sequence on unparsed data; and (3) preserving as many integral data chunks as possible when either local or sporadic changes (insertion, deletions, writes over) are made to the data blocks or files.

According to the chunking algorithm used in this embodiment, one or more chunk delimiters, or breakpoints, are located in each data block that is received for transmission to a receiver. To locate the breakpoints, a distinctive "fingerprint" function F(x) is calculated over a small sliding window (of typically, 24-48 bytes in size) at each byte of the data block. For example, at the $k^{th}$ byte the sliding window would extend backward from the $k^{th}$ byte a <size-of-window> number of bytes. The fingerprint function F(x) is based on a 32-bit irreducible polynomial that produces 32-bit reminders. The fingerprint function F(x) calculates a fingerprint value that depends solely on the current window contents and exhibits good distribution and a low collision probability. (A collision is said to occur when different window contents produce the same fingerprint). Furthermore, the 32-bit polynomial function F(x) is computationally efficient and easy to compute in a rolling manner as the windows slides from one byte to the next.

After calculating the fingerprint value at each byte, the fingerprint value is compared against a breakpoint selection criteria to locate the potential breakpoints. For example, if the fingerprint value F(k) calculated after adding the $k^{th}$ byte satisfies the expression $$F(k) \bmod (2^n - 1) = 0,$$

then the $k^{th}$ byte marks the end of a data chunk and is selected as a breakpoint. Any breakpoint that creates a data chunk smaller than some pre-configured value (e.g. 128 bytes) is ignored and the fingerprinting continues. Once the entire data block has been traversed and a fingerprint value has been calculated at each byte, the boundaries of the one or more data chunks in the data block are determined based on the selected breakpoints. Since the fingerprint values depend solely on the window's contents, the breakpoints are robust against insertions and deletions. Further, since the chunking algorithm used in this embodiment "resynchronizes", or re-starts, after each breakpoint is located, modifications to a data block typically affect only a single chunk.

Figure 4:
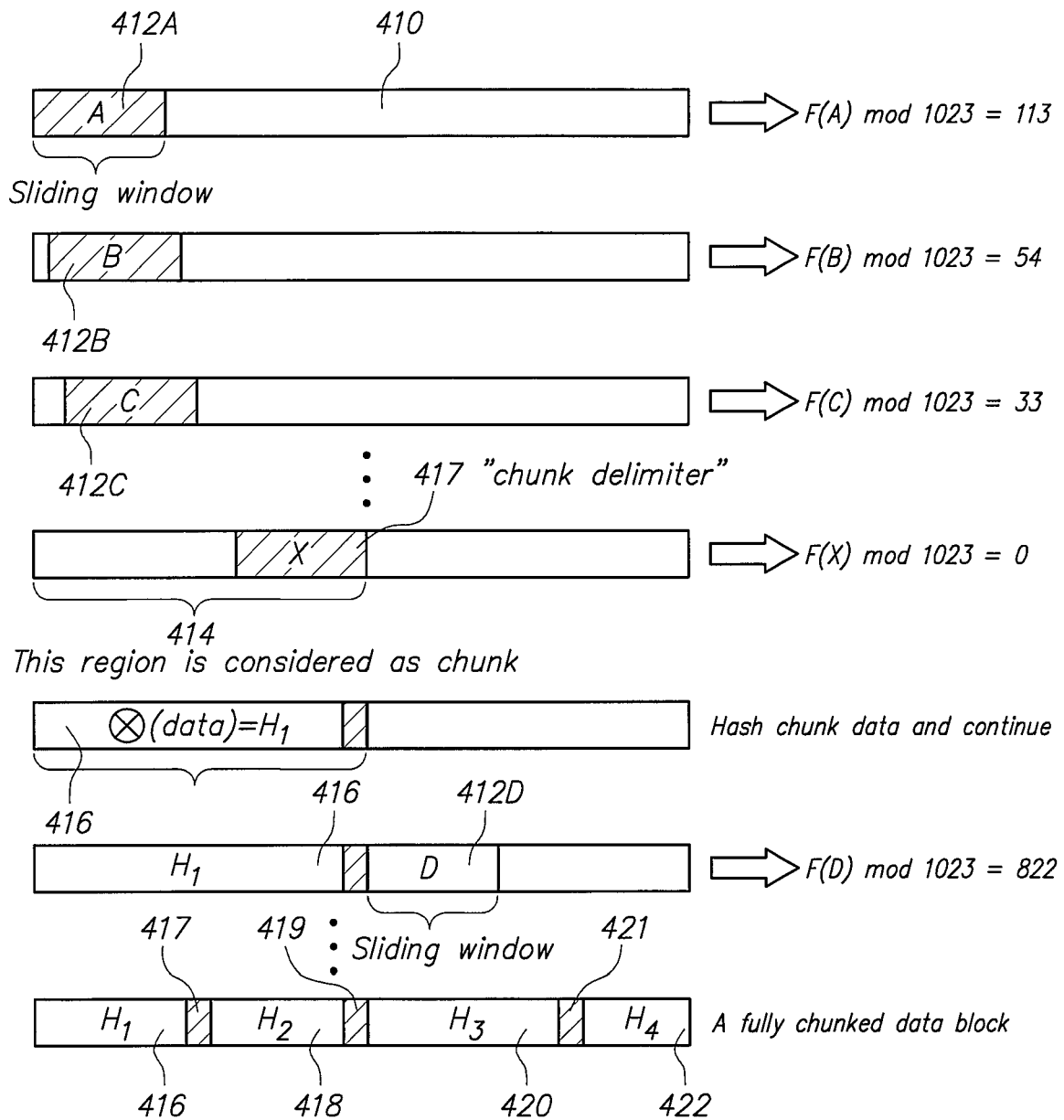
FIG. 4 is a block diagram that illustrates an example of identifying data chunks in a data block according to one embodiment.

FIG. 4 is a block diagram that illustrates an example of identifying data chunks in a data block according to the chunking algorithm used in this embodiment. Suppose that a sliding window of a predetermined number of bytes is used by the algorithm, and that the breakpoint selection criteria is the number "1023", which is also expressed as $(2^{10}-1)$.

The fingerprint function F(x) is computed over sliding window 412A, which defines region "A" of data block 410. Over region A, the expression F(A) mod 1023 evaluates to 113, i.e.

$$F(A) \bmod 1023 = 113.$$

The fingerprint function F(x) is then computed over sliding window 412B, which defines region "B" of data block 410, and $$F(B) \bmod 1023 = 54.$$

Similarly, F(k) is then computed over sliding window 412C that defines region "C" of data block 410, and $$F(C) \bmod 1023 = 33.$$

When the fingerprint function F(x) is computed over region "X", the expression F(X) mod 1023 evaluates to 0, that is, $$F(X) \bmod 1023 = 0.$$

Since the fingerprint over region "X" satisfies the breakpoint selection criteria, the last byte of region "X" is selected as a chunk delimiter (or breakpoint) 417. Thus, chunk delimiter 417 determines a data chunk boundary, and the bytes from the beginning of the data block to the end of region "X" are identified as data chunk 414. Signature 416 is computed for the bytes in data chunk 414, and the algorithm proceeds to calculate the fingerprint function F(x) for the sliding window 412D that defines region "D" in data chunk 410.

In this manner, the fingerprint values at each byte of data block 410 are calculated, breakpoints 417, 419, and 421 are identified, and the signatures 416, 418, 420, and 422 are computed for the data chunks in data block 410. As a result, data block 410 is fully chunked.

In this embodiment, the chunking algorithm produces non-overlapping and variable-length chunks. The average size of the data chunks that are identified in transmitted data blocks depends on the breakpoint selection criteria. The breakpoint selection criteria may be different for different types of operations and data blocks. For example, the breakpoint selection criteria may be set around 1 KB (i.e. 1024 bytes) for data blocks that are written to a receiver (e.g. in the expression F(k) mod $(2^n-1)$, n=10), and slightly more, 4 KB (e.g., in F(k) mod $(2^n-1)$, n=12) for data blocks that are read by the receiver.

In this embodiment, data chunks that are too short (e.g. less than 64 bytes) may be concatenated with the following data chunk. Data chunks that are too long may be broken at some maximal length (e.g. at 8 KB when the average size of the rest of the data chunks is around 1 KB). Further, this embodiment may also provide a maximum size of 64 KB for the data blocks which are transmitted to the receiver and in which the data chunks are identified. The 64 KB maximum length for the data blocks allows for efficient reduction of network traffic caused by CIFS file operations. Setting the maximum length of the data blocks at 64 KB allows a 1:1 mapping with CIFS commands, and this ensures that multiple read or write commands for the same CIFS command are avoided.

In this embodiment, selecting an average size of 1-4 KB for data chunks and setting a maximum size of 64 KB for the data blocks provides for efficient implementation of the techniques for reducing network traffic described herein. For example, smaller data chunks are less likely to be affected by insertions or deletions because the larger the data chunk, the higher the probability that it will be mutated by a modification. Moreover, smaller data chunks may provide for better matching when long files are split to smaller data blocks (with the maximum size of such data block set at 64 KB).

In some embodiments, the chunking algorithms described herein may be used in conjunction with protocol-specific knowledge to in order to further improve the overall system characteristics. For example, specific information the transport protocol over which messages are communicated may be used to select an optimal average chunks size in order to better suit the message payload characteristics. In general, the chunking algorithms described herein may be used in conjunction with any data or protocol information in order to better suit the specific needs of the system in which the techniques described herein are implemented.

In other embodiments, other now known or later developed chunking algorithms may be used for identifying data chunks in the data blocks that are transmitted between a sender and a receiver. An example of such chunking algorithm is the document fingerprinting mechanism described in Saul Schleimer, Daniel S. Wilkerson and Alex Aiken, "*Winnowing: Local Algorithms for Document Fingerprinting*", SIGMOD 2003. In another example, the identifying of data chunks in the data blocks may be based on pre-defined or dynamically calculated offsets in the data blocks that are to be transmitted to a receiver. Thus, the techniques for reducing network traffic described herein are not limited to any particular mechanism or algorithm for identifying data chunks, and the chunking algorithm described herein is to be regarded in an illustrative rather than a restrictive sense.

4.2 Computing Signatures for Data Chunks

In one embodiment, once a data chunk of a data block has been identified, a collision-resistant cryptographic hash function is used to generate the data chunk's signature. The functions used to compute a data chunk's signature may be any now known or later developed functions including, but not limited to, Message Digest 5 (MD5), Secure Hash Algorithm-1 (SHA-1), Hash127, and Panama Hash. In general, any function, which produces a sufficiently large signature to satisfy the collision-resistance requirements of a particular embodiment, may be used.

While the fingerprint values depend only on the content of a short sliding window that precedes the breakpoints, the signature depends on the entire content of the data chunk. Typically, collision-resistant cryptographic functions produce a 128-160 bit output, and their collision rate is many orders of magnitude lower than the possibility of network transmission errors or disk errors going undetected. In addition, in some embodiments a checksum of the entire data block, computed independently of chunk boundaries, may be used to further reduce the encoding/decoding error rate.

4.3 Sender Side Data Structures

According to the techniques described herein, a sender does not need to store any actual data chunk content because the sender identifies a data chunk by using that data chunk's signature.

In one embodiment, the sender maintains a Random Access Memory (RAM) resident hash table that maps the signatures of previously transmitted data blocks with the index values associated with the data chunks. In addition, the sender may also maintain a cyclic index buffer on disk, which is used to identify each index value, starting from the oldest to the newest, with the signature of a previously transmitted data chunk. This cyclic index buffer may be used for data chunk replacement and during startup and failure recovery.

Figure 5:
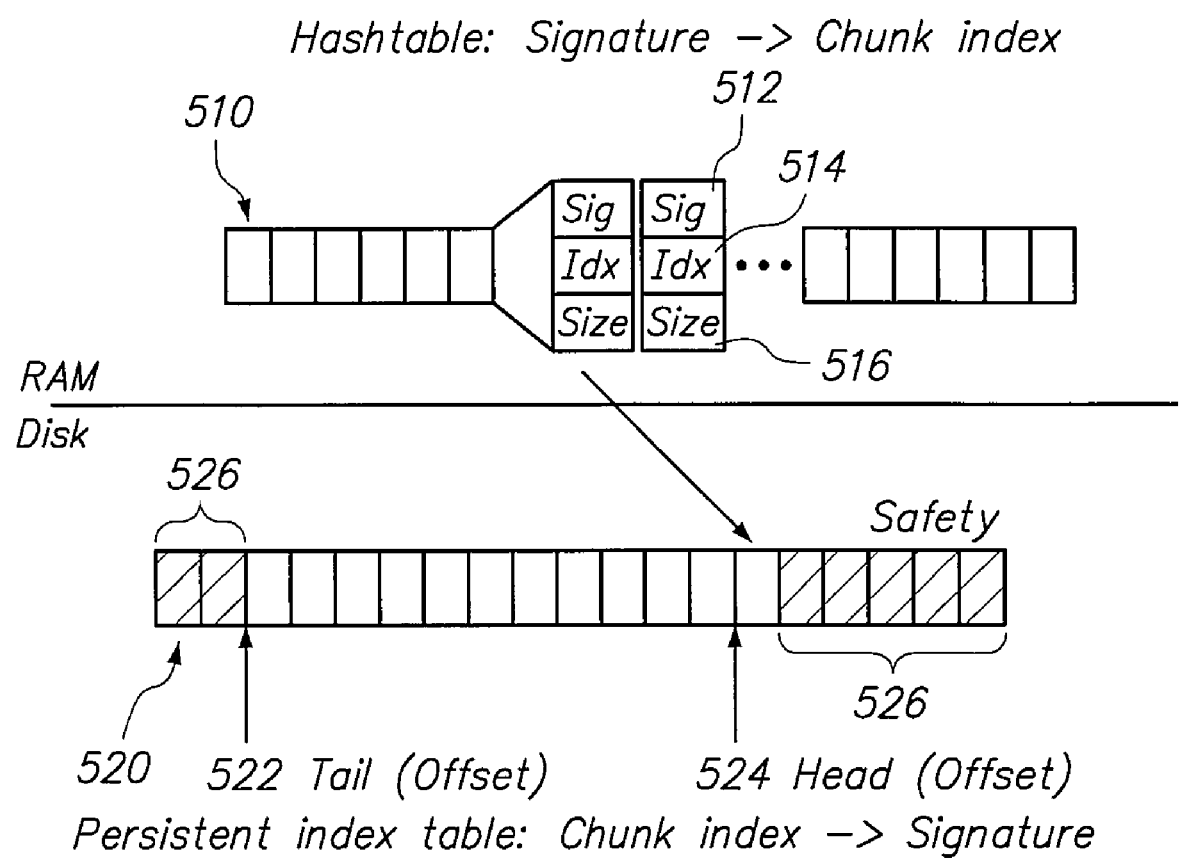
FIG. 5 is a block diagram that illustrates data structures used by a sender according to one embodiment.

FIG. 5 is a block diagram that illustrates data structures used by a sender according to this embodiment.

Hash table 510 is stored in RAM and includes one entry that represents one data chunk that has previously being transmitted to the receiver. Each entry of hash table 510 includes a signature field 512, an index value field 514, and optionally a size field 516. Signature field 512 is used to store the signature computed for a particular data chunk that has previously been transmitted to the receiver. Index value field 514 stores a numeric value that uniquely identifies the particular data chunk. Size field 516 stores the size of the particular data chunk in bytes.

Whenever a new data chunk signature is detected (for example, by failing to match a data chunk signature to any signature stored in any signature field 512 of any entry of hash table 510), a new index value (which is larger by one than the last index value allocated) is assigned to the new signature. The new index value and the new signature are inserted into a new entry of hash table 510, where the new entry uses the signature as the key. In this embodiment, the new entry may not be used for matching signatures of data chunks that the sender needs to transmit until the receiver acknowledges that the new index value and the new data chunk of the new entry have been successfully stored in the receiver's data structures.

In one embodiment, a cyclic buffer 520 is stored on persistent storage and is used for data chunk replacement and during start up and recovery. Whenever a new data chunk signature is detected, in addition to creating a new entry in hash table 510, the new index value and the new signature are also inserted in an entry of buffer 520 where the index value is used as a key. Buffer 520 maintains tail pointer 522 and head pointer 524, which point to the earliest and the newest buffer entries, respectively. Buffer 520 also keeps a number of free entries as a safety region 526 (between head pointer 524 and tail pointer 522) to facilitate effective index wraparound and to aid in crash recovery. In some embodiments, buffer 520 may be stored as a file in a file system. In other embodiments, buffer 520 may be stored as an appropriate data structure in any other persistent storage, such as, for example, as a table in a database.

Whenever a new data chunk is detected by the sender, the size of the data chunk is added to the total size of the other data chunks maintained by the sender. When the total size and/or the total number of the data chunks maintained by the sender increase above some pre-configured limits, the earliest index value is purged from both hash table 510 and buffer 520. The size of the data chunk associated with the earliest index value size is decremented from the total data chunk size. This chunk replacement algorithm may be repeated until the total size and/or the total number of the data chunks maintained by the sender reach acceptable values.

The receiver is aware of the chunk replacement algorithm used by the sender. In particular, the receiver may use the same algorithm to replace data chunks and to remove index values from its data structures. In this way, the sender and the receiver do not need to exchange additional communications for synchronizing the index values that represent previously transmitted data chunks.

The information in the on-disk buffer may further be used to aid in sender re-starts and crash recovery. For example, upon startup the sender may read the information in the on-disk buffer and can efficiently rebuild the in-RAM hash table from this information. In embodiments that support multiple data transmission contexts, the information from one or more on-disk buffers may also be used upon sender startup or re-start for re-synchronization of a data transmission context with the receiver.

In some embodiments, the sender may maintain a separate in-RAM hash table and a corresponding on-disk cyclic buffer for each data transmission context that the sender supports. In other embodiments, the sender may maintain data chunks from multiple data transmission contexts in the same in-RAM hash table and on-disk buffer. In these latter embodiments, information identifying the particular data transmission context (such as, for example, a context ID) may be maintained in the entries of both the in-RAM hash table and the on-disk buffer along with the other data chunk information. Further, in these embodiments information about the data transmission context may be taken into consideration by any data chunk replacement algorithm that is implemented by the sender.

4.4 Receiver Side Data Structures

According to the techniques described herein, unlike the sender, the receiver stores the data chunks themselves in order to be able to reassemble the original data blocks.

In one embodiment, data chunks that are received at the receiver are persistently stored in clusters, which are stored in one or more files in persistent storage. These files represent the receiver cache and are referred to herein as "cluster files". In this embodiment, the size of the clusters is 512 KB each, and the size of each of the one or more cluster flies is 2-8 MB. For efficient persistent storage access, the clusters may store one or more data chunks, and each cluster may be written to, and read from, a cluster file in its entirety. The receiver also maintains a receiver index table that maps each index value that represents a received data chunk to that data chunk's location in the cluster files.

In this embodiment, the receiver index table may be reconstructed from information stored in the cluster files in the event of a receiver failure pr re-start. Further, the size of the receiver index table makes the table suitable for placement in RAM. In other embodiments, the receiver index table may be stored in persistent storage without considerable performance effects since the table's small size, access locality, and direct mapping allow for fast lookups of index values that represent received data chunks.

Figure 6:
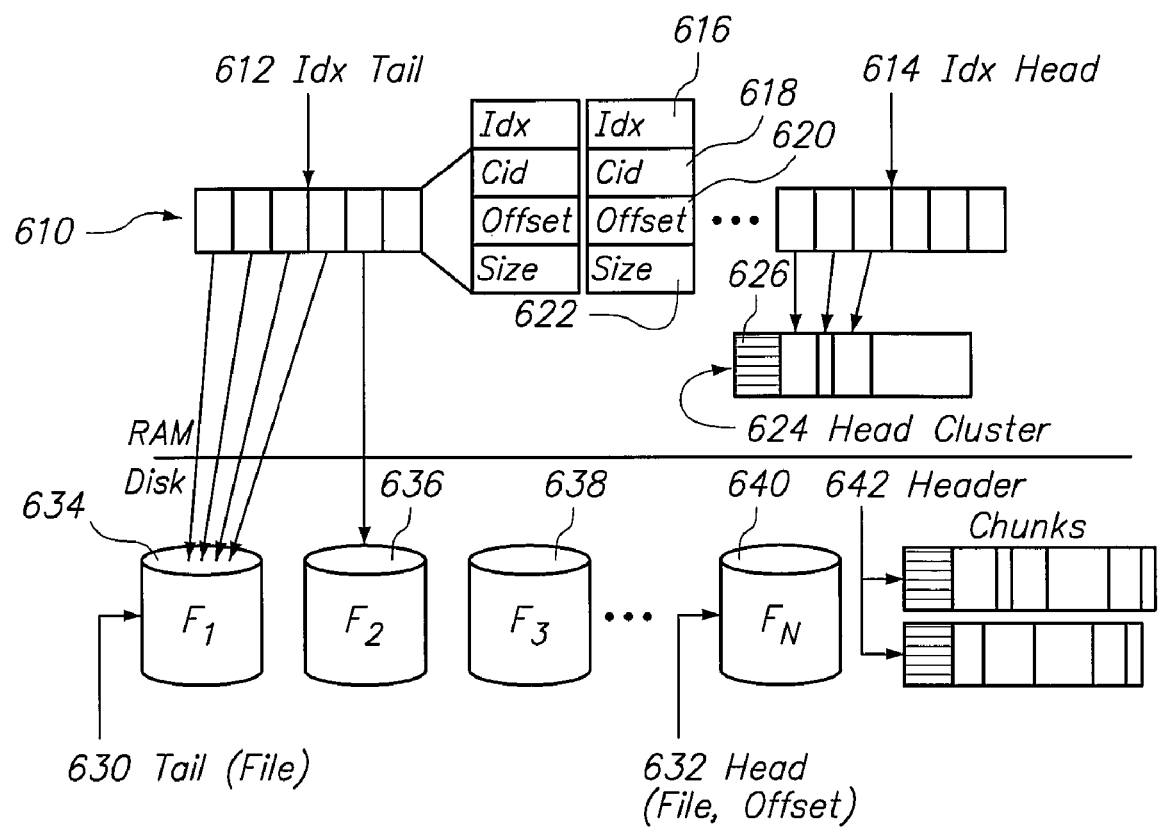
FIG. 6 is a block diagram that illustrates data structures used by a receiver according to one embodiment.

FIG. 6 is a block diagram that illustrates data structures used by a receiver according to this embodiment.

One or more cluster files, such as cluster files 634, 636, 638, and 640, are stored on disk. The one or more cluster files store one or more clusters that include previously received data chunks. The one or more cluster files may also be numbered using a running index, and may be grouped in one or more groups. A tail pointer 630 identifies the earliest cluster stored in the cluster files, and a head pointer 632 identifies the first, or current, cluster stored in the cluster files. The receiver may keep the head cluster and the tail cluster partially filled.

The receiver index table 610 depicted in FIG. 6 includes an entry for each data chunk that has previously been received from the sender and that has been stored in a cluster in one of the cluster files on disk. Each entry of the receiver index table 610 includes an index value field 616, a cluster file identifier field 618, an offset field 620, and optionally a size field 622.

For a particular entry of receiver index table 610 that represents a particular previously received data chunk, index value field 616 stores the index value received from the sender that identifies the particular data chunk. The cluster file identifier field 618 stores an identifier that identifies the cluster file and/or the cluster in which the particular data chunk is stored. The offset field 620 stores the offset in the cluster file at which the data chunk begins. When present in the entries of receiver index table 610, the size field 622 stores the size of the particular data chunk.

The content of newly received data chunks is collected in head cluster 624 that is stored in RAM. Head cluster 624 is flushed to disk when it fills up. Head cluster 624 has a header 626 that stores various information that may be used for crash recovery. The information stored in header 626 may indicate the data transmission context identifier and a random number. The same random number may also be stored at the end of head cluster 624 in order to indicate that the data in the cluster is valid. Header 626 may also store the signatures, index values, and the sizes of all data chunks stored in head cluster 624.

Head cluster 624 fills up at a rate that depends on bandwidth of the communication link between the sender and the receiver. Head cluster 626 is sealed and stored in a cluster file on disk just before it would have exceeded the pre-configured cluster size. A new head cluster is created after a sealed head cluster is stored on disk. Any newly arrived data chunks are going to be part of this new head cluster, thus keeping the sealed cluster below the threshold value. In some embodiments, when data chunks arrive out of order, head cluster 624 may also be used to reorder the received data chunks before saving them in a cluster file.

Each cluster file, such as cluster file 640, may contain a file header 642. The information stored in file header 642 may identify the clusters stored in that cluster file, and may also indicate the data transmission context identifier for each stored cluster. File header 642 may also include various information about the data chunks stored in the cluster file, such as, for example, the clusters, the signatures, the index values, the sizes, and the offsets in that cluster file of all stored data chunks. When a sender connects to the receiver and attempts to establish a shared data transmission context, the receiver may use the information in the cluster files' headers to efficiently reconstruct in RAM the receiver index table 610 for that data transmission context. Further, in embodiments that support multiple data transmission contexts, the information from the file headers in the one or more cluster files may also be used upon receiver re-start for re-synchronization of a particular data transmission context with the sender.

The receiver keeps a tail cluster (which is pointed to by tail pointer 630) that may be partially filled. In embodiments that use a FIFO chunk replacement algorithm, data chunks are logically dropped from the tail cluster, and a cluster file is erased once all data chunks in all of the clusters stored in that cluster file are logically dropped. In this way, the receiver may use a persistent storage of bounded size to store the cluster files, while at the same time providing for efficient management of a large number of data chunks.

One or more clusters may be stored in the same cluster file, and one or more cluster files may store clusters that include data chunks from different data transmission contexts. The one or more cluster files managed by the receiver may be stored in one or more directories, and the one or more directories may be stored in one or more local or network file systems.

In the embodiment depicted in FIG. 6, the receiver index table 610 is maintained as a cyclic buffer similarly to way the signatures-to-index on-disk buffer is maintained at the sender. A tail pointer 612 points to the earliest entry in the receiver index table 610, and a head pointer 614 points to the current entry of the table. The head pointer 614 and the tail pointer 612 are used to implement the same chunk replacement algorithm that is implemented at the sender.

For example, whenever the receiver receives a new data chunk, the receiver adds the size of that data chunk to the total size of the other data chunks that it maintains. When the total size and/or the total number of the data chunks maintained by the receiver increase above some pre-configured limits, the earliest index value is purged from receiver index table 610, and the data chunk represented by that index value is logically dropped from the tail cluster in the cluster file (such as, for example, the cluster pointed to by tail pointer 630) in which the data chunk is stored. The size of the data chunk associated with the earliest index value size is decremented from the total data chunk size. This chunk replacement algorithm may be repeated until the total size and/or the total number of the data chunks maintained by the sender reaches an acceptable value. By using a common chunk replacement algorithm, the window of common data chunks is maintained exactly the same at both the sender and the receiver, and the synchronization between the sender and the receiver is guaranteed.

In one embodiment, the receiver index table may be maintained as an array that is indexed by using the index values that are assigned by the sender to the transmitted data chunks. In this embodiment, the chunk replacement algorithm described above results in a First-In-First-Out (FIFO) replacement of data chunks in which the index values assigned to the data chunks are used to indicate the order of replacement.

Similarly to the sender, in some embodiments the receiver may maintain a separate in-RAM receiver index table and corresponding on-disk cluster files for each data transmission context that the receiver supports. In other embodiments, the receiver may maintain data chunks from multiple data transmission contexts in the same in-RAM receiver index table and on-disk cluster files. In these latter embodiments, information identifying the particular data transmission context (such as, for example, a context ID) may be maintained in the entries of the receiver index table and in the cluster files in addition to the other data chunk information. Further, in these embodiments information about the data transmission context may be taken into consideration by any data chunk replacement algorithm that is implemented by the receiver.

4.5 Using Sequential Index Values to Represent Data Chunks

In one embodiment, the sender and the receiver use sequential index values instead of signatures to identify data chunks. The use of sequential index values provides for efficient utilization of RAM and disk storage space and for controlling the storage space overhead. The use of sequential index values also reduces the transmission overhead (using index values that are smaller than data chunk signatures reduces the size of messages transmitted between the sender and the receiver). The use of sequential index values to represent data chunks at the receiver further allows the receiver to access its data structures more efficiently by using an array index instead of a hash table. In addition, index vales provide explicit ordering of data chunks and ease the synchronization of data transmission contexts between the sender and the receiver.

In an embodiment that makes use of clusters and cluster files as a cache for storing transmitted data chunks at the receiver, the use of sequential index values allows related data chunks (e.g. data chunks that appear in the same data block) to be stored in sequential locations in the cluster files. For example, since related data chunks are assigned sequential index values, the related data chunks are stored in sequential clusters, which sequential clusters are subsequently stored at successive locations in the receiver cluster files. In this way, the receiver is able to avoid multiple, and potentially costly, disk access operations when related data chunks are being written to, or read from, the receiver cluster files.

In one embodiment, an index value is 28 bits (i.e. 3.5 bytes) in size. In this embodiment, an additional control nibble of 4 bits brings the total index value size to 4 bytes, thus allowing efficient processing on 32-bit processors. In this embodiment, since index values are of a finite size, the index values may be wrapped around periodically. By using 28 bits for the index values, a total of 256 million data chunks may be represented at the sender and the receiver before the index rolls over.

In order to simplify the index value manipulation, in some embodiments the sender and the receiver may use an on-disk cyclic buffer and a receiver index table, respectively, that have an upper limit on their size. For example, the sender on-disk cyclic buffer and the receiver index table may be pre-configured for a maximum number of $2^{20}$ entries. In this case, the index values are wrapped around when the newest index value reaches $2^{20}-1$. In addition, in order to allow more implementation leeway in tolerating index value wrap-arounds, a safety region may be provided between the earliest and newest index values.

4.6 Data Transmission Context Synchronization and Recovery

In some embodiments, the techniques described herein may further provide for tolerance against disconnections and possible crashes that interrupt the on-going synchronization between the sender and the receiver. In these embodiments, as data chunks are logically kept in a FIFO sequence order based on their index values, in order to maintain on-going synchronization the sender and the receiver agree where the window of common data chunks starts and where it ends. Since certain signaling from the sender to the receiver regarding adding new data chunks or deleting old data chunks may get lost, the two sides may periodically determine the largest window of common data chunks.

In some embodiments, the sender initiates a communication in an attempt to establish a shared data transmission context state with the receiver. The state of the data transmission context may be identified by various attributes including, but not limited to, a unique data transmission context identifier, a range of index values (which represent data chunks) associated with the context identifier, and an average chunk size associated with the context identifier.

When the sender and the receiver share a common data transmission context, they also share the same context identifier for that data transmission context. A mismatch between the data transmission contexts maintained at the sender and the receiver may cause an empty data transmission context to be initialized. The values for the context identifiers may be chosen by the sender in such a way as to guard against accidental sharing of context and/or index value ranges. For example, an initial context identifier of zero may be used to denote an empty data transmission context, or the sender may select the context identifier of a new data transmission context based on a random number generator.

In order to establish a shared data transmission context, the sender may send a request to the receiver, which request may include the context identifier that the sender uses to identify this particular data transmission context. If the receiver determines, based on the received context identifier, that it has a matching data transmission context, the receiver responds to the request by specifying the highest and lowest index values that it stores for that context. If the request received from the sender includes the range of index values maintained by the sender, the receiver may also include in the response the receiver's highest and lowest index values within that range. In addition, in order to allow for further verification by the sender, the receiver may also compute and send in the response the signatures of the data chunks that are represented by the range of index values included in the response. In this way, the sender and the receiver may negotiate, and start with, the largest window of common chunk index values for a particular shared data transmission context.

The messages exchanged between the sender and the receiver may also include various information in order to allow for detection of a synchronization loss. For example, the sender and the receiver may infer synchronization loss from missing index values, from mismatched chunk sizes, and/or from differing data block checksums carried as part of specific read or write operations. Furthermore, in some embodiments special synchronization verification messages may be used by the sender and the receiver to improve synchronization resiliency. For example, the sender may periodically send random data chunks for verification by the receiver, specifying their index values, signatures, and sizes.

If synchronization is lost for a data transmission context, the party that detects it may transition into recovery mode and perform some or all of the following steps: log an error; return an error to the sending party identifying the operation which failed because of the loss of synchronization; nullify the data transmission context for which the synchronization loss occurred and start a new data transmission context; and initialize a new data transmission context and retry the failed operation.

4.7 Extensions for File Version Read-Miss Scenarios

In some embodiments, the techniques for reducing network traffic described herein may be used to operate on files or sub-file segments in situations where the receiver would store an old version of a file and the sender would have access to a newer version of the same file. In these situations, a version read-miss for the file occurs when the receiver needs to provide the file to a client because the receiver determines that it needs to first obtain the newer version of the file from the sender.

For example, with respect to FIG. 1, it may happen that an edge server, such as edge server 120, has cached a version of a particular file, and a file server, such as file server 110, may store a newer version of the same particular file. (A new version of the file may have been created, for example, when the file on the file server is modified by a user local to the file server or by a user connected through a different edge server.) In this situation, when edge server 120 is requested to provide the cached version of the particular file to a client, such as for example client 126A, edge server 120 may first check with core server 102 to determine whether file server 110 stores a newer version of the particular file. If file server 110 stores a newer version of the particular file, then a version read-miss for the file occurs because edge server 120 needs to obtain the new version of the file from core server 102 before responding to client 126A.

In order to efficiently address such version read-miss scenarios, the techniques for reducing network traffic described herein may provide for a mechanism to exploit the redundancy among the different file versions. Specifically, such mechanism may minimize the communications required to create the new file version at the receiver by leveraging the data chunking and data chunk signing techniques described herein along with the shared data transmission context that is established between the sender and the receiver.

In one embodiment, such mechanism may comprise the following steps. A receiver receives a request from a client for a file for which the receiver has cached, or has access to, a particular version. The receiver retrieves and splits this particular version of the file into one or more data chunks according to the data chunking techniques described herein. The beginning of the first data chunk is aligned with the file's first byte and the end of the last data chunk is aligned with the file's last byte. The receiver then computes a signature for each of the one or more data chunks according the techniques described herein. In some embodiments, the receiver may actually store the one or more data chunks of the receiver's version of the file and/or their associated signatures in a temporary transmission dictionary that is associated with that particular file, where such dictionary may be stored in persistent storage or in volatile memory.

The receiver then creates and transmits to the sender a message that includes the filename of the file and an ordered list of the signatures (referred to herein as identifier list) computed for the one or more data chunks of the receiver's version of the file. The sender receives the message and, based on the filename, retrieves a newer version of the file from a location where the file is stored, such as, for example, a local cache or a file server.

Similarly to the receiver, the sender then splits the newer version of the file into one or more data chunks and computes a signature for each data chunk. In some embodiments, similarly to the receiver, the sender may also store the one or more data chunks and/or their associated signatures in a temporary transmission dictionary that is associated with the file. The sender then generates for sending back to the receiver one or more messages that collectively represent an output stream which includes, for each data chunk of the newer version of the file, a reference identifying that data chunk in the receiver's version of the file (e.g. a reference to a data chunk in the temporary transmission dictionary), an index value associated with that data chunk in the shared data transmission context established between the sender and the receiver, or the data chunk itself along with its signature.

Specifically, the sender checks the signatures computed for data chunks in the newer version of the file against the signatures in the identifier list received from the receiver to determine whether each data chunk in the newer version of the file is present in the receiver's version of the file. If such data chunk is located in the receiver's version of the file, then only a reference identifying that data chunk in the receiver's version of the file (e.g. a reference to a data chunk in the temporary transmission dictionary) is sent back to the receiver. If such data chunk is not located in the receiver's version of the file, then the sender checks its sender index table to determine whether the data transmission context established between the sender and the receiver contains a data chunk that has that particular signature. If such data chunk is located within the data transmission context, then only the index value associated with that data chunk in the sender index table is sent back to the receiver. If such data chunk is not located neither within the receiver's version of the file nor within the data transmission context established between the sender and the receiver, then the entire data chunk and its signature are sent back to the receiver. After performing the above steps for each data chunk in the newer version of the file, the sender sends the generated one or more messages to the receiver.

The receiver receives the one or more messages. From the receiver's perspective the one or more messages collectively represent an input stream associated with the newer version of the file, which input stream may include new data chunks included in the newer version of the file along with their signatures, references identifying data chunks in the receiver's version of the file, and/or index values identifying data chunks in the data transmission context established between the sender and the receiver. Based on the information included in the input stream, the receiver retrieves the necessary data chunks from the receiver cache of previously transmitted data chunks and/or from the receiver's version of the file, and uses these data chunks along with the new data chunks included in the input stream to assemble the newer version of the file. In embodiments in which the sender and the receiver maintain temporary transmission dictionary associated with the file, the sender and the receiver may discard the temporary transmission dictionary when the receiver has assembled the newer version of the file and has notified the sender accordingly.

In some embodiments, the request for the newer version of the file from the receiver to the sender may include only the filename of the file. In these embodiments, the sender would first split the newer version of the file in one or more data chunks and would compute a signature for each data chunk. The sender would then respond to the request by sending an identifier list of signatures to the receiver. The receiver would then split its version of the file into one or more data chunks and, based on the identifier list of signatures received from the sender, would determine which data chunks it needs. The receiver would then request from the sender only those data chunks which it needs in order to assemble the newer version of the file.

One of the advantages of the mechanism described above for handling version read-miss scenarios is that the sender and the receiver do not need to keep in their shared data transmission context any persistent data, such as, for example, signatures and data chunks, that is associated with different versions of the same file. This reduces the storage and other resource requirements for the sender and the receiver, and reduces the number of data chunks that are replaced in the receiver cache of previously transmitted data chunks. Such reduction of data chunk replacements in the receiver cache facilitates faster processing of data chunks at the receiver, especially in large scale systems in which the receiver may have to process a large number of data chunks as part of supporting on-line file operations and in which the receiver cache may store a large number of data chunks.

4.8 Additional Features and Alternative Embodiments

Coalescing Data Blocks for Write Operations

In some embodiments, depending on the type of write operations supported by a sender and a receiver, the techniques described herein may reduce network traffic more optimally for read operations than for write operations. For example, the reduction of network traffic for write operations may be less than optimal because data may be written randomly in small, non-contiguous, data blocks.

In these embodiments, the sender may combine smaller data blocks of multiple write commands into larger data blocks and may make these larger data blocks available for chunking. Coalescing multiple write commands in this way may also reduce the number of messages sent to the receiver, decrease the actual bandwidth used, and improve the receiver scalability.

In one embodiment, coalescing data blocks for write operations may be implemented by buffering and combining only write commands that address consecutive file offsets. This technique may work well for applications that perform mostly sequential writes of relatively large regions of a file, such as, for example, the Microsoft Office® family of applications. In other embodiments, buffering and combining data blocks of write commands may be implemented across writes to non-sequential regions of a file.

In some embodiments, more than one region of a file may be written to at any given time. New data blocks resulting from such writes may be buffered and combined in one or more larger data blocks. In these embodiments, overlapping writes may replace currently buffered data blocks and new data blocks may also be coalesced with data blocks from previous writes. The new data blocks may be buffered until some event causes them to be flushed from the sender. The new data blocks may be flushed when various criteria are satisfied, such as, for example, when a maximum delay over the communication link is reached, when a maximum reserved buffer storage is exceeded, and when a write command (such as, for example, the CIFS command sequence of close, flush, lock) requires it. In some embodiments, only some of the new data blocks may be flushed when certain criteria are satisfied, allowing the rest to be buffered in anticipation of further coalescing. The flushed data blocks may be chosen based on various algorithms that improve the chance of coalescing, such as, for example, FIFO or longer sequences first. Further, if the overall write dependency and the write operations' semantics are preserved, data blocks that are buffered during write coalescing may be sent to the receiver in an order that is different than the order in which the data blocks were received by the sender.

Prepositioning of Data

In some embodiments, the techniques described herein may also be used by a sender and a receiver for prepositioning data at the receiver. As referred to herein, prepositioning refers to transferring to the receiver certain data, which is considered as likely to be requested by clients that are communicatively connected to the receiver. For example, a sender, such as core server 102 depicted in FIG. 1, may determine that a particular file, which is often read by clients communicatively connected to edge server 102, has changed. Instead of waiting for a client to request the file, the sender core server 102 may request the changed file from file server 110 and may transmit the data blocks of the file to the receiver edge server 120 according to the techniques described herein. In this way, the next time a client, such as client 126A, requests to read a data block from the file, edge server 120 will be able to find the data block in its receiver cache and will be able to respond locally to the clients' request without the need to transfer any data over the communication link to core server 102.

Prepositioning of data may be initiated by either the sender or the receiver, and the actual transferring of the data being prepositioned is performed according to the techniques described herein. Further, the prepositioning of data may be initiated at any time, such as, for example, when the sender and/or the receiver detect that there is available bandwidth on the communication link that connects them. In another example, the sender and the receiver may perform prepositioning of data at certain predetermined times. The sender and the receiver may also preposition data in response to a request for an operation from a client, which operation affects certain data that is related to the data being prepositioned. For example, a client may request to read a certain data block from a file. In addition to the certain data block, the sender may transfer to the receiver one or more data blocks that contiguously follow the requested data block with the expectation that the client will also request these one or more data blocks relatively soon.

In one embodiment, since prepositioning is not performed interactively in response to an operation from a client, the techniques described herein are much more tolerant of delays. This allows the sender and the receiver to transfer larger files, segments, and data blocks thus improving the utilization of bandwidth on the communication link between them.

In some embodiments, the sender and the receiver may use file recipes in prepositioning data by using the techniques described herein. A file recipe, as used herein, refers to the list of chunk signatures of data chunks that constitute a particular version of a file. File recipes may be used when multiple receivers preposition data from the same sender. Further, file recipes may be used in all "Read Miss" scenarios in which a client communicatively connected to a receiver requests data from a file that must by transferred from the sender. For example, a scenario that may make use of file recipes may involve edge servers 120, 130, and 140 in FIG. 1 acting as receivers that preposition the same files from sender core server 102. File recipes may also allow senders and receivers to preposition data more efficiently, for example, by employing shorter jobs first scheduling and by taking into account data chunks that have already been transferred.

Clustering of Core Servers

In one operational context, such as the operational context depicted in FIG. 1, one or more edge servers connect to the same core server, where the edge servers may be established in the LANs of the branch offices of a business organization and the core server may be established at the LAN of the main office. In this operational context, a plurality of core servers may be organized in a core server cluster in order to be able to support a large number of edge servers.

In some embodiments implemented in this operational context, the cluster of core servers may employ load balancing that is based on a per-edge server basis and not on a per-connection link basis. For example, the core servers in the cluster may maintain the data transmission contexts of each edge server separately. In these embodiments, the load balancing may be performed by providing access to cluster state information that is shared between the core servers in the cluster, for example, by using a shared file system or group communications. The data transmission contexts of each particular edge server are made accessible to any core server that is member of the cluster. Since each edge server is connected to a cluster member, little synchronization is required for the transfer of data transmission context states and data transmission context ownerships to any newly added cluster members. A newly connected core server in the cluster may re-create both "sender" and "receiver" data transmission contexts from the "sender" and "receiver" persistent data structures that are shared by the other cluster members.

In other embodiments implemented in this operational context, the data transmission contexts of the edge servers may be maintained at the cluster members on a per-client basis for each client of the edge servers. Handling data transmission contexts on a per-client basis allows the load balancing of edge server clients between different cluster members. The load balancing may be performed by providing access to cluster state information that is shared between the core servers in the cluster. Since the data chunks of any particular per-client data transmission context are stored at a particular core server of the cluster, synchronization among the cluster members may be required. Further, chunk signatures may be used to distribute data chunks between the cluster members in a uniform and predetermined way, for example, by using a Web-cache Locality-Aware Request Distribution (LARD)-like algorithm. Alternately, Bloom filters can be used to locate the cluster member holding a specific data chunk.

Directory Listing Processing

In one embodiment, the techniques for reducing network traffic described herein may use protocol-level knowledge of the content being transferred for identifying data chunks and for selecting data chunks of different average size. For example, a client that is communicatively connected to a receiver may request the listing of the entries in a directory that is established on a file server in a remote network. A sender in the remote network that is communicatively connected to the file server requests the listing of the entries in the directory from the file server. The sender then considers the directory as a data block, and identifies each entry in the directory as a separate data chunk. The sender then proceeds to transfer the listing of the entries in the directory according to the techniques described herein. In this way, the structure of a directory as defined in the particular file system is used to identify data chunks, where the contents of the directory are considered as a data block and each separate file name in the directory is identified as a separate data chunk.

5.0 Implementation Mechanisms—Hardware Overview

Figure 7:
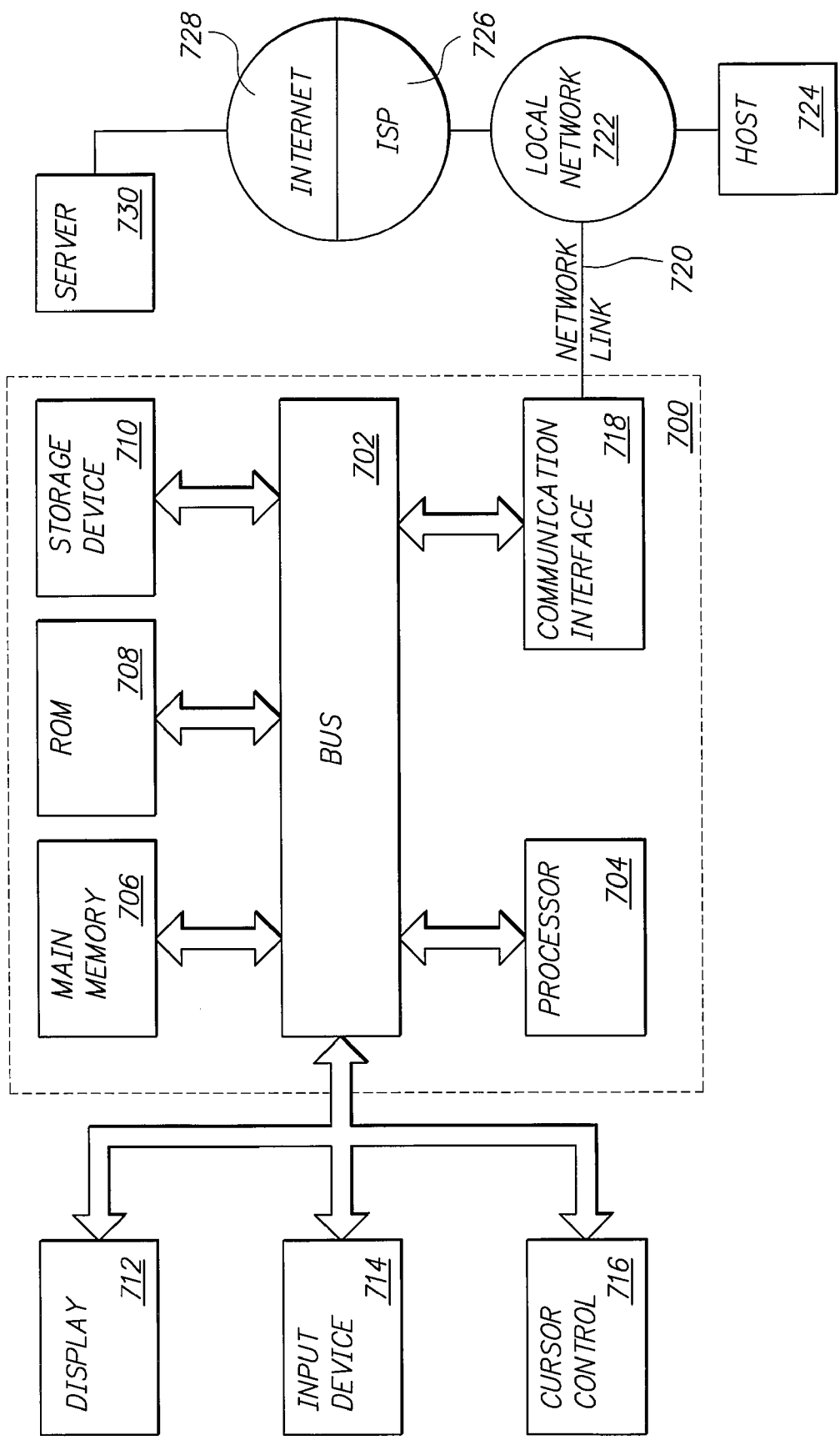
FIG. 7 is a block diagram that illustrates a computer system upon which an embodiment may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory ("RAM") or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory ("ROM") 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube ("CRT"), for displaying information to a computer user. An input device 714, including alphanumeric and other keys, is coupled to bus 702 for communicating information and command selections to processor 704. Another type of user input device is cursor control 716, such as a mouse, trackball, stylus, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for reducing network traffic. According to one embodiment of the invention, reducing network traffic is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network ("ISDN") card or a modem to provide a data communication connection to a corresponding type of telephone line. As another example, communication interface 718 may be a local area network ("LAN") card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider ("ISP") 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for reducing network traffic as described herein.

The received code may be executed by processor 704 as it is received, and/or stored in storage device 710, or other non-volatile storage for later execution. In this manner, computer system 700 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of reducing network traffic, the method comprising the computer-implemented steps of:

at a sender, receiving a data block for transmission to a receiver, wherein the sender and the receiver are connected over a communication link;

identifying one or more data chunks in the data block;

computing a signature for each of the one or more data chunks;

for each of the one or more data chunks, performing the steps of:

determining whether that data chunk has previously been transmitted by looking up the signature of that data chunk in a sender index table that associates signatures with unique index values, wherein looking up the signature of that data chunk comprises retrieving, from the sender index table, an index value that is associated with the signature of that data chunk if that data chunk has been previously transmitted; and creating a new index value, in the sender index table, that is associated with the signature of that data chunk if that data chunk has not been previously transmitted;

wherein, in the sender index table, each signature is a single numeric value that does not include the associated unique index value;

wherein the sender does not cache any previously transmitted data chunks;

creating a message for transmitting the data block to the receiver, wherein:

for each of the one or more data chunks that has previously been transmitted, the message includes the index value that is associated with the signature of that data chunk, but not that data chunk; and for each of the one or more data chunks that has not been previously transmitted, the message includes that data chunk and the new index value that is associated with the signature of that data chunk;

transmitting the message to the receiver; and at the receiver, assembling the data block based on the message, wherein:

for each of the one or more data chunks that has previously been transmitted, retrieving that data chunk from a receiver cache of previously transmitted data chunks, wherein that data chunk is located in the receiver cache by looking up the index value for that data chunk received in the message in a receiver index table that associates the unique index values with the locations in the receiver cache of the previously transmitted data chunks; and for each of the one or more data chunks that has not been previously transmitted, storing that data chunk in the receiver cache and associating, in the receiver index table, the new index value for that data chunk received in the message with the location of that data chunk in the receiver cache.

2. A method as recited in claim 1, wherein:

the sender and the receiver maintain a data transmission context, wherein:

at the sender, the data transmission context comprises the sender index table; and at the receiver, the data transmission context comprises the receiver cache and the receiver index table; and the method further comprises synchronizing the data transmission context at the sender and at the receiver.

3. A method as recited in claim 2, wherein synchronizing the data transmission context further comprises maintaining the unique index values at the sender and at the receiver, wherein new index values created in the sender index table are used for looking up signatures only after the receiver has acknowledged that the new index values have been stored in the receiver index table.

4. A method as recited in claim 2, wherein:
the data transmission context is associated with one or more data blocks from one or more files; and
the data block received at the sender is from a specific file of the one or more files.

5. A method as recited in claim 2, wherein the data transmission context is a first data transmission context of a plurality of data transmission contexts that are maintained by the sender and the receiver.

6. A method as recited in claim 1, wherein:
the sender is a first server established on a first Local Area Network (LAN); and
the receiver is a second server established on a second LAN,
wherein the first server and the second server are connected over the communication link.

7. A method as recited in claim 6, wherein:
the sender is communicatively connected to a client over the first LAN;
the receiver is communicatively connected to a file server over the second LAN;
the client sends the data block to the sender as part of a write operation to a file managed by the file server; and
after the receiver assembles the data block, the receiver writes the data block to the file at the file server.

8. A method as recited in claim 6, wherein:
the sender is communicatively connected to a file server over the first LAN;
the receiver is communicatively connected to a client over the second LAN;
the file server sends the data block to the sender as part of a read operation from a file managed by the file server, wherein the read operation is requested by the client; and
after the receiver assembles the data block, the receiver sends the data block to the client.

9. A method as recited in claim 6, wherein the communication link is any one of a dial-up connection, a Wide Area Network (WAN) connection, a Digital Subscriber Line (DSL) connection, and an Integrated Services Digital Network (ISDN) connection.

10. A method as recited in claim 1, wherein the steps of the method are performed as part of a file operation that conforms to a Common Internet File System (CIFS) protocol.

11. A method as recited in claim 1, wherein:
the sender receives a request from a client to perform a file operation, wherein the data block is received as part of the request; and
the method is performed in response to receiving the request.

12. A method as recited in claim 1, wherein identifying the one or more data chunks in the data block further comprises:
based on a sliding window of a predetermined number of bytes, calculating a fingerprint value at each byte of the data block;
locating one or more breakpoints in the data block based on the fingerprint values calculated at each byte of the data block; and
based on the one or more breakpoints, determining the boundaries of the one or more data chunks of the data block.

13. A method as recited in claim 1, wherein computing the signature for each of the one or more data chunks comprises applying a hash function to that data chunk.

14. A method as recited in claim 1, wherein one or more index values associated with the one or more data chunks of the data block are sequential numbers that reflect the order in which the one or more data chunks appear in the data block.

15. A method as recited in claim 1, wherein:
creating the message for transmitting the data block to the receiver further comprises computing a first checksum value over the data block and including the first checksum value in the message; and
assembling the data block based on the message at the receiver further comprises verifying the integrity of the assembled data block by computing a second checksum value over the assembled data block and comparing the second checksum value to the first checksum value that is included in the message.

16. A method of reducing network traffic, the method comprising the computer-implemented steps of:
at a sender, identifying a data chunk for transmission to a receiver, wherein the sender and the receiver are connected over a communication link;
computing a signature of the data chunk;
determining whether the data chunk has previously been transmitted by looking up the signature in a sender index table, wherein the sender index table associates signatures of previously transmitted data chunks with unique index values;
wherein looking up the signature comprises retrieving, from the sender index table, an index value that is associated with the signature when the data chunk has been previously transmitted;
wherein, in the sender index table, each signature is a single numeric value that does not include the associated unique index value;
wherein the sender does not cache any previously transmitted data chunks;
transmitting a message to the receiver, wherein if the data chunk has previously been transmitted, then the message includes the index value, retrieved from the sender index table, that is associated with the signature of the data chunk; and
at the receiver, locating the data chunk in a receiver cache that stores the previously transmitted data chunks by looking up the index value included in the message in a receiver index table, wherein the receiver index table associates the unique index values with the locations in the receiver cache of the previously transmitted data chunks.

17. A method as recited in claim 16, wherein, if the data chunk has not been previously transmitted, then the message includes the data chunk in addition to the index value from the sender index table that is associated with the signature of the data chunk.

18. A method as recited in claim 16, wherein the sender index table comprises:
a first data structure stored in volatile storage that maps the signatures to the unique index values;
wherein the first data structure stores the signatures as look-up keys;
a second data structure stored in persistent storage that maps the unique index values to the signatures, wherein the first data structure is created in the volatile storage based on the second data structure;
wherein the second data structure stores the unique index values as look-up keys; and
wherein the step of determining whether the data chunk has previously been transmitted comprises looking up the signature in the first data structure.

19. A method as recited in claim 18, wherein the second data structure is stored in a file organized as a circular buffer.

20. A method as recited in claim 16, wherein:
the receiver cache comprises one or more files stored in persistent storage, wherein the one or more files store previously transmitted data chunks; and
the receiver index table comprises a data structure stored in volatile storage, wherein the receiver index table maps the unique index values to the locations, in the one or more files, of the previously transmitted data chunks that are associated with the unique index values.

21. A system for reducing network traffic, comprising:
a sender that comprises first one or more processors and first one or more stored sequences of instructions; and
a receiver that comprises second one or more processors and second one or more stored sequences of instructions;
wherein:
the sender and the receiver are connected over a communication link;
the first one or more stored sequences of instructions, when executed by the first one or more processors, cause the first one or more processors to perform the steps of:
receiving a data block for transmission to the receiver;
identifying one or more data chunks in the data block;
computing a signature for each of the one or more data chunks;
for each of the one or more data chunks, performing the steps of:
determining whether that data chunk has previously been transmitted by looking up the signature of that data chunk in a sender index table that associates signatures with unique index values, wherein looking up the signature of that data chunk comprises retrieving, from the sender index table, an index value that is associated with the signature of that data chunk if that data chunk has been previously transmitted; and
creating a new index value, in the sender index table, that is associated with the signature of that data chunk if that data chunk has not been previously transmitted;
wherein, in the sender index table, each signature is a single numeric value that does not include the associated unique index value;
wherein the sender is not operable to cache any previously transmitted data chunks;
creating a message for transmitting the data block to the receiver, wherein:
for each of the one or more data chunks that has previously been transmitted, the message includes the index value that is associated with the signature of that data chunk, but not that data chunk; and
for each of the one or more data chunks that has not been previously transmitted, the message includes that data chunk and the new index value that is associated with the signature of that data chunk; and
transmitting the message to the receiver; and
the second one or more stored sequences of instructions, when executed by the second one or more processors, cause the second one or more processors to perform the steps of:
receiving the message from the sender; and
assembling the data block based on the message, wherein:
for each of the one or more data chunks that has previously been transmitted, retrieving that data chunk from a receiver cache of previously transmitted data chunks, wherein that data chunk is located in the receiver cache by looking up the index value for that data chunk received in the message in a receiver index table that associates the unique index values with the locations in the receiver cache of the previously transmitted data chunks; and
for each of the one or more data chunks that has not been previously transmitted, storing that data chunk in the receiver cache and associating, in the receiver index table, the new index value for that data chunk received in the message with the location of that data chunk in the receiver cache.

22. The system of claim 21, wherein:
the receiver is a first server; and
the sender is one server of a plurality of servers that are connected to the first server over one or more communication links.

23. The system of claim 21, wherein:
the sender is a first server; and
the receiver is one server of a plurality of servers that are connected to the first server over one or more communication links.

24. An apparatus for reducing network traffic, comprising:
one or more processors;
a network interface coupled to the one or more processors for sending and receiving one or more packet flows therefrom; and
one or more stored sequences of instructions which, when executed by the one or more processors, cause the one or more processors to perform the steps of:
receiving a data block for transmission to a receiver, wherein the receiver is connected to the network interface over a communication link;
identifying one or more data chunks in the data block;
computing a signature for each of the one or more data chunks;
for each of the one or more data chunks, performing the steps of:
determining whether that data chunk has previously been transmitted by looking up the signature of that data chunk in a sender index table that associates signatures with unique index values, wherein looking up the signature of that data chunk comprises retrieving, from the sender index table, an index value that is associated with the signature of that data chunk if that data chunk has been previously transmitted; and
creating a new index value, in the sender index table, that is associated with the signature of that data chunk if that data chunk has not been previously transmitted;
wherein, in the sender index table, each signature is a single numeric value that does not include the associated unique index value;
wherein the sender is not operable to cache any previously transmitted data chunks;
creating a message for transmitting the data block to the receiver, wherein:
for each of the one or more data chunks that has previously been transmitted, the message includes the index value that is associated with the signature of that data chunk, but not that data chunk; and for each of the one or more data chunks that has not been previously transmitted, the message includes that data chunk and the new index value that is associated with the signature of that data chunk; and transmitting the message to the receiver, wherein the receiver assembles the data block based on the message, wherein:

for each of the one or more data chunks that has previously been transmitted, the receiver retrieves that data chunk from a receiver cache of previously transmitted data chunks, wherein that data chunk is located in the receiver cache by looking up the index value for that data chunk received in the message in a receiver index table that associates the unique index values with the locations in the receiver cache of the previously transmitted data chunks; and for each of the one or more data chunks that has not been previously transmitted, the receiver stores that data chunk in the receiver cache and associates, in the receiver index table, the new index value for that data chunk received in the message with the location of that data chunk in the receiver cache.

25. The apparatus of claim 24, wherein:

the apparatus is a sender that maintains a data transmission context, wherein at the sender the data transmission context comprises the sender index table;

the receiver maintains the same data transmission context, wherein at the receiver the data transmission context comprises the receiver cache and the receiver index table; and the data transmission context is synchronized at the sender and at the receiver by maintaining the unique index values at the sender and at the receiver, wherein new index values created in the sender index table are used for looking up signatures only after the receiver has acknowledged that the new index values have been stored in the receiver index table.

26. The apparatus of claim 25, wherein:

the data transmission context is a first data transmission context of a plurality of data transmission contexts that are maintained by the sender and the receiver;

the first data transmission context is associated with one or more data blocks from one or more files; and the data block is from a specific file of the one or more files.

27. The apparatus of claim 24, wherein:

the one or more processors are in a first server that is established in a first Local Area Network (LAN); and the receiver is a second server established on a second LAN.

28. The apparatus of claim 27, wherein:

the first server is communicatively connected to a client over the first LAN;

the second server is communicatively connected to a file server over the second LAN;

the client sends the data block to the first server as part of a write operation to a file managed by the file server; and after the second server assembles the data block, the second server writes the data block to the file at the file server.

29. The apparatus of claim 27, wherein:

the first server is communicatively connected to a file server over the first LAN;

the second server is communicatively connected to a client over the second LAN;

the file server sends the data block to the first server as part of a read operation from a file managed by the file server, wherein the read operation is requested by the client; and after the second server assembles the data block, the second server sends the data block to the client.

30. The apparatus of claim 24, wherein the communication link is any one of a dial-up connection, a Wide Area Network (WAN) connection, a Digital Subscriber Line (DSL) connection, and an Integrated Services Digital Network (ISDN) connection.

31. The apparatus of claim 24, wherein identifying the one or more data chunks in the data block further comprises:

based on a sliding window of a predetermined number of bytes, calculating a fingerprint value at each byte of the data block;

locating one or more breakpoints in the data block based on the fingerprint values calculated at each byte of the data block; and based on the one or more breakpoints, determining the boundaries of the one or more data chunks of the data block.

32. The apparatus of claim 24, wherein computing the signature for each of the one or more data chunks comprises applying a hash function to that data chunk.

33. The apparatus of claim 24, wherein one or more index values associated with the one or more data chunks of the data block are sequential numbers that reflect the order in which the one or more data chunks appear in the data block.

34. The apparatus of claim 24, wherein:

creating the message for transmitting the data block to the receiver further comprises computing a first checksum value over the data block and including the first checksum value in the message; and assembling the data block based on the message at the receiver further comprises verifying the integrity of the assembled data block by computing a second checksum value over the assembled data block and comparing the second checksum value to the first checksum value that is included in the message.

35. An apparatus for reducing network traffic, comprising:

one or more processors;

means for identifying a data chunk for transmission to a receiver, wherein the receiver is connected to the apparatus over a communication link;

means for computing a signature of the data chunk;

means for determining whether the data chunk has previously been transmitted by looking up the signature in a sender index table, wherein the sender index table associates signatures of previously transmitted data chunks with unique index values;

means for retrieving from the sender index table, as part of looking up the signature, an index value that is associated with the signature of the data chunk when the data chunk has been previously transmitted;

wherein, in the sender index table, each signature is a single numeric value that does not include the associated unique index value;

wherein the sender is not operable to cache any previously transmitted data chunks;

means for transmitting a message to the receiver, wherein if the data chunk has previously been transmitted, then the message includes the index value, retrieved from the sender index table, that is associated with the signature of the data chunk; and wherein the receiver locates the data chunk in a receiver cache that stores the previously transmitted data chunks by looking up the index value included in the message in a receiver index table, wherein the receiver index table associates the unique index values with the locations in the receiver cache of the previously transmitted data chunks.

36. The apparatus of claim 35, wherein, if the data chunk has not been previously transmitted, then the message includes the data chunk in addition to the index value from the sender index table that is associated with the signature of the data chunk.

37. The apparatus of claim 35, wherein the sender index table comprises:

a first data structure stored in volatile storage that maps the signatures to the unique index values;

wherein the first data structure stores the signatures as look-up keys:

a second data structure stored in persistent storage that maps the unique index values to the signatures, wherein the first data structure is created in the volatile storage based on the second data structure;

wherein the second data structure stores the unique index values as look-up keys; and wherein the means for determining whether the data chunk has previously been transmitted comprise means for looking up the signature in the first data structure.

38. The apparatus of claim 35, wherein:

the receiver cache comprises one or more files stored in persistent storage, wherein the one or more files store previously transmitted data chunks; and the receiver index table comprises a data structure stored in volatile storage, wherein the receiver index table maps the unique index values to the locations, in the one or more files, of the previously transmitted data chunks that are associated with the unique index values.

\* \* \* \* \*

UNITED STATES PATENT AND TRADEMARK OFFICE
CERTIFICATE OF CORRECTION

PATENT NO. : 7,636,767 B2  Page 1 of 1
APPLICATION NO. : 11/290188
DATED : December 22, 2009
INVENTOR(S) : Lev-Ran et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 690 days.

Signed and Sealed this

Twenty-first Day of December, 2010

David J. Kappos
*Director of the United States Patent and Trademark Office*